(12) United States Patent
Kajiwara

(10) Patent No.: US 6,833,086 B2
(45) Date of Patent: Dec. 21, 2004

(54) PHOSPHOR POWDER AND PRODUCTION METHOD THEROF, DISPLAY PANEL, AND FLAT-PANEL DISPLAY DEVICE

(75) Inventor: Kazuo Kajiwara, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/275,067

(22) PCT Filed: Mar. 7, 2002

(86) PCT No.: PCT/JP02/02095
§ 371 (c)(1),
(2), (4) Date: Nov. 1, 2002

(87) PCT Pub. No.: WO02/074879
PCT Pub. Date: Sep. 26, 2002

(65) Prior Publication Data
US 2003/0102797 A1 Jun. 5, 2003

(51) Int. Cl.[7] .................. C09K 11/08; C09K 11/56; H01J 1/63
(52) U.S. Cl. .................. 252/301.6 S; 252/301.4 R; 252/301.4 S; 252/301.4 P; 252/301.6 P; 252/301.6 R; 428/403; 428/404; 428/690; 313/486; 313/496; 313/582
(58) Field of Search .................. 428/690; 313/428, 313/496, 582

(56) References Cited

U.S. PATENT DOCUMENTS

| | | | | |
|---|---|---|---|---|
| 3,607,371 A | * | 9/1971 | Haynes et al. | 427/157 |
| 4,140,940 A | * | 2/1979 | Uehara et al. | 313/467 |
| 4,181,627 A | * | 1/1980 | Weiher et al. | 252/301 |
| 4,181,753 A | * | 1/1980 | Fischer | 427/64 |
| 4,740,728 A | * | 4/1988 | Uchida et al. | 313/467 |
| 5,739,632 A | * | 4/1998 | Haase et al. | 313/467 |
| 5,844,361 A | * | 12/1998 | Petersen et al. | 313/495 |
| 6,540,898 B2 | * | 4/2003 | Rasmussen | 204/485 |

FOREIGN PATENT DOCUMENTS

| | | |
|---|---|---|
| JP | 50-146579 | 11/1975 |
| JP | 51-105984 | 9/1976 |
| JP | 53-17587 | 2/1978 |
| JP | 3-190991 | 8/1991 |
| JP | 3-295194 | 12/1991 |
| JP | 5-171141 | 7/1993 |
| JP | 5-255665 | 10/1993 |
| JP | 8-183954 | 7/1996 |
| JP | 8-283711 | 10/1996 |
| JP | 9-13029 | 1/1997 |
| JP | 9-217058 | 8/1997 |
| JP | 2000-96045 | 4/2000 |

OTHER PUBLICATIONS

Translation for JP 2000–96045, Apr. 4, 2000.*
Derwent abstract for KR 2001–83324, Sep. 1, 2001.*

* cited by examiner

Primary Examiner—C. Melissa Koslow
(74) Attorney, Agent, or Firm—Rader, Fishman & Grauer, PLLC

(57) ABSTRACT

A phosphor powder is composed of a host material made of an element coming under the group II of the periodic table and an element coming under the group VI of the periodic table, an activator and a co-activator, the amount ratio of the activator to the host material is $1 \times 10^{-4}$ to $1 \times 10^{-3}$ parts by weight when the amount ratio of the host material is 1 part by weight, and the co-activator has a molar concentration equal to a molar concentration of the activator.

27 Claims, 23 Drawing Sheets

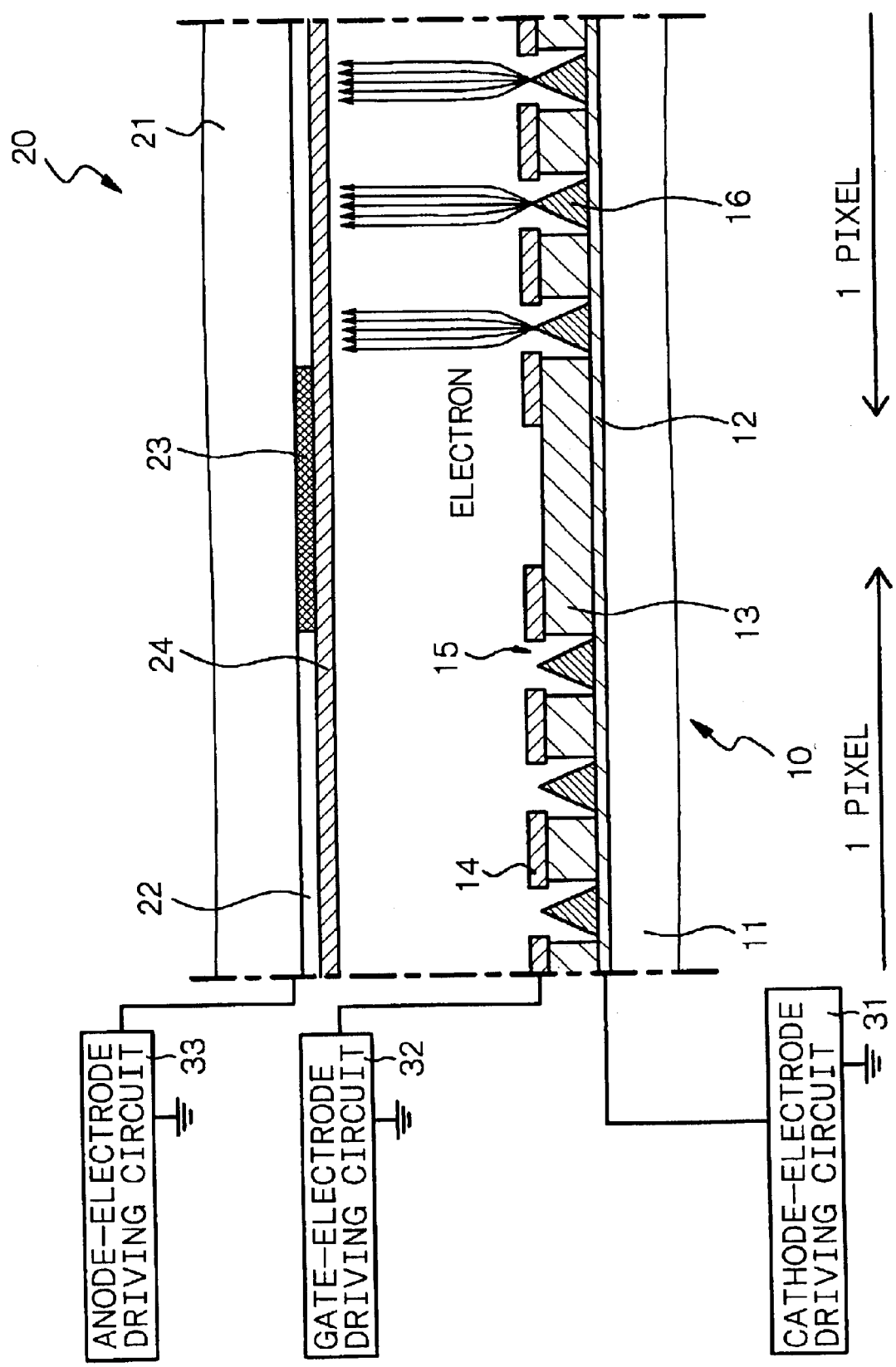

[STEP-100]

[STEP-110]

[STEP-120]

[STEP-120] CONTINUED

[STEP-230]

[STEP-250]

[STEP-260]

[STEP-270]

PHOSPHOR POWDER AND PRODUCTION METHOD THEROF, DISPLAY PANEL, AND FLAT-PANEL DISPLAY DEVICE

TECHNICAL FIELD

The present invention relates to a phosphor powder (phosphor crystal particle) and a production method thereof, a display panel constituted of such phosphor powders and a flat-panel display device having such a display panel.

BACKGROUND ART

As an image display device that can be substituted for a currently mainstream cathode ray tube (CRT), flat-type (flat-panel) display devices are studied in various ways. Such fat-panel display devices include a liquid crystal display (LCD), an electroluminescence display (ELD) and a plasma display (PDP). There has been also proposed a cold cathode field emission display capable of emitting electrons into a vacuum from a solid without relying on thermal excitation, a so-called field emission display (FED), and it attracts attention from the viewpoint of the brightness of a display screen and low power consumption.

FIG. 4 shows a typical constitution of the cold cathode field emission display. In this cold cathode field emission display, a display panel 20 and a back panel 10 are placed so as to face each other, and these two panels 10 and 20 are bonded to each other through a frame (not shown) in their circumferential portions. A space closed with these two panels forms a vacuum space. The back panel 10 has cold cathode field emission devices (to be referred to as "field emission devices" hereinafter) as electron-emitting elements. One example shown in FIG. 4 is a so-called Spindt-type field emission device having a conical electron-emitting portion 16. The Spindt-type field emission device comprises a stripe-shaped cathode electrode 12 formed on a substrate 11; an insulating layer 13 formed on the cathode electrode 12 and the substrate 11; a stripe-shaped gate electrode 14 formed on the insulating layer 13; and a conical electron-emitting portion 16 formed in an opening portion 15 formed in the gate electrode 14 and the insulating layer 13. The electron-emitting portion 16 is formed on a portion of the cathode electrode 12 which portion is positioned in a bottom portion of the opening portion 15. Generally, a number of such electron-emitting portions 16 are formed to correspond to one of luminescent layers 22 to be described later. A relatively negative voltage (video signal) is applied to the electron-emitting portion 16 from a cathode-electrode driving circuit 31 through the cathode electrode 12, and a negatively positive voltage (scanning signal) is applied to the gate electrode 14 from a gate-electrode driving circuit 32. An electric field is generated due to the application of these voltages, and due to the electric field, electrons are emitted from the top end of the electron-emitting portion 16 on the basis of a quantum tunnel effect. The field emission device shall not be limited to the above Spindt-type field emission device, and field emission devices of other types such as plane-type, edge-type, flat-type or crown-type field emission devices are used in some cases. Further, reversibly, the scanning signal may be inputted to the cathode electrode 12, and the video signal may be inputted to the gate electrode 14.

The display panel 20 has a plurality of luminescent layers 22 which are formed on a support member 21 made of glass or the like and have the form of dots or stripes, and an anode electrode 24 made of an electrically conductive reflection film formed on the luminescent layers 22 and the support member 21. A positive voltage higher than the positive voltage applied to the gate electrode 14 is applied to the anode electrode 24 from an accelerating power source (anode-electrode driving circuit) 33, and it works to guide electrons emitted from the electron-emitting portion 16 to the vacuum space toward the luminescent layer 22. Further, the anode electrode 24 functions to protect the phosphor powders (phosphor particles) constituting the luminescent layer 22 from sputtering by particles such as ions, functions to reflect light emitted from the luminescent layers 22 on the basis of electron excitation to the side of the support member 21 to improve the brightness of a display screen observed from an outside of the support member 21, and functions to prevent excess charge to stabilize the potential of the display panel 20. That is, the anode electrode 24 not only carries out its function as an anode electrode but also carries out the function of a member known as a metal back layer in the field of a cathode ray tube (CRT). The anode electrode 24 is generally constituted of a thin aluminum film. A black matrix 23 is formed between one luminescent layer 22 and another luminescent layer 22.

FIG. 5A shows a schematic plan view of the display panel having luminescent layers 22R, 22G and 22B formed in the form of dots, and FIG. 5B shows a schematic partial cross-sectional view taken along a line X—X in FIG. 5A. A region where the luminescent layers 22R, 22G and 22B are arranged is an effective field which carries out a practical function as a cold cathode field emission display, and a region where the anode electrode is formed is nearly in agreement with the effective field. For clear showing in FIG. 5A, the region where the anode electrode is formed is provided with slanting lines. A circumferential region to the effective field is an ineffective field for supporting the function of the effective field, where peripheral circuits are formed and a display screen is mechanically supported.

In the cold cathode field emission display, the anode electrode is not necessarily required to be constituted of the anode electrode 24 made of an electrically conductive reflection film as mentioned above. It may be constituted of an anode electrode 25 made of a transparent electrically conductive film formed on the support member 21, as is shown in FIG. 5C which is a schematic partial cross-sectional view similarly taken along a line X—X in FIG. 5A. On the support member 21, each of the anode electrodes 24 and 25 is formed nearly on the entire surface of the effective field.

FIG. 6A shows a schematic plan view of the display panel having the luminescent layers 22R, 22G and 22B formed in the form of stripes, and FIGS. 6B and 6C show schematic partial cross-sectional views taken along a line X—X in FIG. 6A. In FIGS. 6A, 6B and 6C, the same portions as those in FIGS. 5A, 5B and 5C are shown by the same reference numerals, and detailed explanations of the same portions are omitted. FIG. 6B shows a constitution in which the anode electrode 24 is made of an electrically conductive reflection film, and FIG. 6C shows a constitution in which the anode electrode 25 is made of a transparent electrically conductive film. Each of the anode electrodes 24 and 25 is formed nearly on the entire surface of the effective field of the display panel.

In the cold cathode field emission display that is a flat-panel display device, the flying distance of electrons is far smaller than the counterpart in a cathode ray tube, so that it is difficult to increase an electron-accelerating voltage to the level of an electron-accelerating voltage in the cathode ray tube. In the cold cathode field emission display, if the electron-accelerating voltage is too high, spark discharge is liable to take place between the gate electrode or the electron-emitting portion in the back panel and the anode electrode provided in the display panel, and the display quality may be impaired to a great extent. The accelerating voltage is therefore controlled to be approximately 10 kilovolts or lower.

In addition to the above problem, the cold cathode field emission display for which it is required to select the above low electron-accelerating voltage involves characteristic problems from which the cathode ray tube is free. In a cathode ray tube permitting the acceleration at a high voltage, electrons enter the luminescent layer deep, so that the electron energy is received in a relatively broad region inside the luminescent layer to excite a relatively large number of phosphor powders present in such a broad region at once, and high luminescence efficiency can be attained. When the accelerating voltage is set at 31.5 kilovolts and when the luminescent layer is made of ZnS, Monte Carlo simulation is conducted with regard to a relationship between an energy loss of electrons which have entered the luminescent layer and the electron penetration depth into the luminescent layer on the basis of the Bethe expression represented by the following equation (1) (see "Practical Scanning Electron Microscopy", J. I. Goldstein and H. Yokowitz, p 50, Plenun Press, New York (1975)). FIG. 20 shows the result thereof. It is seen from FIG. 20 that when the accelerating voltage is 31.5 kilovolts, the peak of electron energy loss is positioned approximately 1 $\mu$m apart from the surface of the luminescent layer. Further, electrons enter approximately 5 $\mu$m deep from the surface of the luminescent layer. In the simulation, it is assumed that electrons lose approximately 43 eV in average (mean free path: approximately 4.8 nm) due to one scattering, and they stop after they suffer elastic scatterings approximately 150 times in average.

$$-(dE_m/dX)=2\pi e^4 N_0(Z/A)(\rho/E_m)\ln(1.166E_m/J) \tag{1}$$

In the cold cathode field emission display, however, the accelerating voltage is required to be approximately 10 kilovolts or lower, for example, approximately 6 kilovolts. When the accelerating voltage is set at 6 kilovolts and when the luminescent layer is made of ZnS, Monte Carlo simulation is conducted with regard to a relationship between an energy loss of electrons which have entered the luminescent layer and the electron penetration depth into the luminescent layer on the basis of the above Bethe expression, and FIGS. 21 and 22 show the results. In FIG. 21, it is assumed that a 0.045 $\mu$m thick aluminum thin film is formed on the surface of the luminescent layer, and in FIG. 22, it is assumed that a 0.07 $\mu$m thick aluminum thin film is formed on the surface of the luminescent layer. FIGS. 21 and 22 show that the peak of electron energy loss is positioned near the outermost surface of the luminescent layer. Further, electrons enter only approximately 0.2 to 0.3 $\mu$m deep from the surface of the luminescent layer. In the cold cathode field emission display in which the accelerating voltage is lower than that in the cathode ray tube, the electron penetration depth into the luminescent layer is small, and the electron energy can be received only in a narrow region of the luminescent layer (particularly, only near the surface of the luminescent layer).

In the luminescent layer, further, approximately 10% of the energy of electrons contributes to light emission, and the remaining approximately 90% of the energy is converted to heat. That is, heat is generated greatly near the surface of the luminescent layer. As a result, when the luminescent layer is constituted of phosphor powders made of a sulfide, sulfur that is a component therefore is dissociated in the form of a single atom or in the form of sulfur monoxide (SO) or sulfur dioxide ($SO_2$), and the phosphor powders made of a sulfide alter in composition or a luminescence center disappears. When the accelerating voltage is set at 6 kilovolts and when the luminescent layer is made of ZnS, Monte Carlo simulation is conducted with regard to a relationship between an energy loss of electrons which have entered the luminescent layer and the electron penetration depth into the luminescent layer on the basis of the above Bethe expression, and FIG. 23 shows the result thereof. In FIG. 23, it is assumed that a 0.07 $\mu$m thick aluminum thin film is formed on the surface of the luminescent layer and that Zn is formed due to dissociation of sulfur (S) from ZnS in a thickness ranging from the surface of the luminescent layer to a portion approximately 0.03 $\mu$m deep from the surface. FIG. 23 clearly shows that the peak of electron energy loss is positioned in a region of the luminescent layer which region is made of Zn due to the dissociation of sulfur (S) from ZnS. Further, electrons reach only approximately 0.2 $\mu$m deep from the surface of the luminescent layer.

In the cold cathode field emission display, further, the position in the luminescent layer (more specifically, phosphor powders) with which position electrons emitted from one field emission device collide is generally constant unlike the cathode ray tube. Therefore, the phosphor powders with which the electrons collide constantly is deteriorated greatly as compared with other phosphor powders, and the phosphor powders are deteriorated faster that the counterpart in the cathode ray tube.

Further, the outermost surface of the phosphor powder suffers various strains during the processes of producing the phosphor powders and producing the display panel and is liable to have lattice defects. Moreover, it is required to drive the cold cathode field emission display at a higher current density (emitted-electron density) than the cathode ray tube for attaining desired luminescence efficiency. For example, a current density in the cathode ray tube is 0.1 to 1 $\mu A/cm^2$, while the cold cathode field emission display requires a current density of as high as 5 to 10 $\mu A/cm^2$. It is therefore required to operate the outermost surface of the phosphor powder or a portion nearby under high-excitation conditions. While the cold cathode field emission display is operated, crystal defects are liable to be formed or multiplied newly in the phosphor powder, which is considered to cause the deterioration of the luminescence efficiency to proceed faster.

The above-explained deterioration of the luminescent layer or the phosphor powders results in the fluctuation of emitted-light color and luminescence efficiency, the contamination of internal components of the cold cathode field emission display and a consequent decrease in reliability and lifetime characteristics of the cold cathode field emission display. It is therefore strongly desired to develop a luminescent layer or phosphor powders free from deterioration, that is, free from crystal defects, for improving the cold cathode field emission display in reliability and lifetime characteristics.

For attaining finer display with a cathode ray tube, it is required to decrease a diameter of an electron beam that collides with the luminescent layer. That is, it is required to increase the current density of the electron beam that collides with the luminescent layer. In this method, however, the phosphor powders that emit light in green are particularly liable to be damaged, and such a phenomenon leads to the generation of a magenta ring. The above magenta ring refers to a phenomenon in which the phosphor powders that emit light in red and light in blue are scarcely damaged, and in the cathode ray tube, a magenta color that is a complementary color to green is observed in the form of a ring. In the conventional cathode ray tube, the current density of the electron beam that collides with the luminescent layer and the lifetime of the cathode ray tube are inversely proportional to each other. For preventing a decrease in the lifetime of the cathode ray tube while increasing the current density of the electron beam that collides with the luminescent layer, it is strongly desired to develop a luminescent layer or phosphor powders which is/are deteriorated to a less degree, that is, has/have crystal defects to a less degree.

It is therefore an object of the present invention to provide phosphor powders that have crystal defects to a less degree and are deteriorated to a less degree even in use for a long period of time, namely, that suffer a decrease in luminescence efficiency to a less degree, a display panel constituted of such phosphor powders, and a flat-panel display device provided with such a display panel.

DISCLOSURE OF THE INVENTION

The phosphor powder according to a first aspect of the present invention for achieving the above object is a phosphor powder composed of a host material made of an element coming under the group II of the periodic table and an element coming under the group VI of the periodic table, an activator and a co-activator, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator.

The display panel according to a first aspect of the present invention for achieving the above object is a display panel comprising a support member, a luminescent layer made of phosphor powders which emit light upon irradiation with electrons that come flying through a vacuum space, and an electrode, wherein said phosphor powder is composed of a host material made of an element coming under the group II of the periodic table and an element coming under the group VI of the periodic table, an activator and a co-activator, and the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator.

The flat-panel display device according to a first aspect of the present invention for achieving the above object is a flat-panel display device comprising a display panel and a back panel having a plurality of electron emitting regions, the display panel and the back panel being disposed to face each other through a vacuum space interposed therebetween, wherein the display panel comprises a support member, a luminescent layer made of phosphor powders which emit light upon irradiation with electrons that come flying from the electron emitting region, and an electrode, said phosphor powder is composed of a host material made of an element coming under the group II of the periodic table and an element coming under the group VI of the periodic table, an activator and a co-activator, and the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator.

The phosphor powder, the display panel and the flat-type display device according to the first aspect of the present invention will be generically simply referred to as "first aspect of the present invention" for convenience hereinafter.

In the first aspect of the present invention, the amount ratio of the activator (corresponding to an acceptor in the field of semiconductor technology) is defined, whereby a number of light emission centers can be therefore provided, so that effective light emission can be attained. Further, it is also made possible to avoid a problem that the amount of impurities that do not contribute to light emission increases and that a concentration extinction that is to decrease activation efficiency may take place. Further, the molar concentration of the co-activator (corresponding to a donor in the filed of semiconductor technology) is arranged to be equal to the molar concentration of the activator, whereby remarkably high light emission efficiency can be obtained. In addition, the amount ratio of the activator is defined, and the molar concentration of the co-activator is arranged to be equal to the molar concentration of the activator, whereby a phosphor powder obtained is improved in crystallinity, and there can be obtained a phosphor powder that does not much deteriorate in the continuous use for a long period of time, that is, which does not much decrease in luminescence efficiency.

The activator and the co-activator can be measured for their amount ratios by chemical analysis, for example, atomic absorption analysis.

The phosphor powder according to a second aspect of the present invention for achieving the above object is a phosphor powder having a surface free of a topmost-surface crystal-lattice-defect layer or a surface-damaged layer.

The display panel according to a second aspect of the present invention for achieving the above object is a display panel comprising a support member, a luminescent layer made of phosphor powders which emit light upon irradiation with electrons that come flying through a vacuum space, and an electrode, wherein said phosphor powder has a surface free of a topmost-surface crystal-lattice-defect layer or a surface-damaged layer.

The flat-panel display device according to a second aspect of the present invention for achieving the above object is a flat-panel display device comprising a display panel and a back panel having a plurality of electron emitting regions, the display panel and the back panel being disposed to face each other through a vacuum space interposed therebetween, wherein the display panel comprises a support member, a luminescent layer made of phosphor powders which emit light upon irradiation with electrons that come flying from the electron emitting region, and an electrode, and said phosphor powder has a surface free of a topmost-surface crystal-lattice-defect layer or a surface-damaged layer.

The phosphor powder, the display panel and the flat-type display device according to the second aspect of the present invention will be generically simply referred to as "second aspect of the present invention" for convenience hereinafter.

In the second aspect of the present invention, the topmost-surface crystal-lattice-defect layer or the surface-damaged layer is removed from the surface of the phosphor powder, so that a phosphor powder obtained is improved in crystallinity, and there can be obtained a phosphor powder that does not much deteriorate in the continuous use for a long period of time, that is, which does not much decrease in luminescence efficiency.

By preparing a laminar sample of cross section of the phosphor powder and observing the laminar sample for a bright field image and a lattice image through a transmission electron microscope, it can be inspected whether or not the topmost-surface crystal-lattice-defect layer or the surface-damaged layer is removed from the surface of the phosphor powder.

The phosphor powder according to a third aspect of the present invention for achieving the above object is a phosphor powder having a surface coated with a chemical-reaction layer containing phosphoric acid.

The display panel according to a third aspect of the present invention for achieving the above object is a display panel comprising a support member, a luminescent layer made of phosphor powders which emit light upon irradiation with electrons that come flying through a vacuum space, and an electrode, wherein said phosphor powder has a surface coated with a chemical-reaction layer containing phosphoric acid.

The flat-panel display device according to a third aspect of the present invention for achieving the above object is a flat-panel display device comprising a display panel and a back panel having a plurality of electron emitting regions, the display panel and the back panel being disposed to face each other through a vacuum space interposed therebetween, wherein the display panel comprises a support member, a luminescent layer made of phosphor powders which emit light upon irradiation with electrons that come flying from the electron emitting region, and an electrode, and said phosphor powder has a surface coated with a chemical-reaction layer containing phosphoric acid.

The phosphor powder, the display panel and the flat-type display device according to the third aspect of the present invention will be generically simply referred to as "third aspect of the present invention" for convenience hereinafter.

In the third aspect of the present invention, the average thickness of the chemical-reaction layer is desirably 1 nm to 5 nm. When the average thickness of the chemical-reaction layer is too large, light transmitted from the phosphor powder may be absorbed by the chemical-reaction layer. Desirably, the chemical-reaction layer has a thickness that is as uniform as possible. The chemical-reaction layer can be formed in the surface-treatment step in a production method of a phosphor powder to be described later. The chemical-reaction layer is preferably made of zinc phosphate or calcium phosphate.

As a surface treatment of a phosphor powder, conventionally, there has been employed a method in which silica is allowed to adhere to the surface of a phosphor powder by a sol-gel method or a method in which a powdered silica is allowed to adhere to the surface of a phosphor powder. According to studies made by the present inventor, it has been found that when a phosphor powder is irradiated with energy flux, the silica is decomposed and a crystal in the surface of the phosphor powder to which the silica has adhered is caused to have a defect. It is considered that when the chemical-reaction layer containing phosphoric acid is formed on the phosphor powder, the chemical-reaction layer undergoes a kind of epitaxial growth on the surface of the phosphor powder, and a crystal lattice defect does not easily occur on the surface of the phosphor powder due to the formation of the chemical-reaction layer, so that the phosphor powder is improved in crystallinity. Further, damage does not easily occur in the chemical-reaction layer even under irradiation with energy flux, so that there can be obtained a phosphor powder that does not easily deteriorate in continuous use for a long period of time, that is, which does not easily decrease in luminescence efficiency.

By preparing a laminar sample of cross section of the phosphor powder and observing the laminar sample for a bright field image and a lattice image through a transmission electron microscope, it can be inspected whether or not the chemical-reaction layer is formed on the surface of the phosphor powder. The layer thickness can be also measured by the same method.

The phosphor powder according to a fourth aspect of the present invention for achieving the above object is a phosphor powder having a temperature $T_{50}$ of at least 200° C., the temperature $T_{50}$ being a temperature at which a luminescence efficiency reaches ½ of a luminescence efficiency at 25° C. in a thermal quenching performance.

The display panel according to a fourth aspect of the present invention for achieving the above object is a display panel comprising a support member, a luminescent layer made of phosphor powders which emit light upon irradiation with electrons that come flying through a vacuum space, and an electrode, wherein said phosphor powder has a temperature $T_{50}$ of at least 200° C., the temperature $T_{50}$ being a temperature at which a luminescence efficiency reaches ½ of a luminescence efficiency at 25° C. in a thermal quenching performance.

The flat-panel display device according to a fourth aspect of the present invention for achieving the above object is a flat-panel display device comprising a display panel and a back panel having a plurality of electron emitting regions, the display panel and the back panel being disposed to face each other through a vacuum space interposed therebetween, wherein the display panel comprises a support member, a luminescent layer made of phosphor powders which emit light upon irradiation with electrons that come flying from the electron emitting region, and an electrode, and said phosphor powder has a temperature $T_{50}$ of at least 200° C., the temperature $T_{50}$ being a temperature at which a luminescence efficiency reaches ½ of a luminescence efficiency at 25° C. in a thermal quenching performance.

The phosphor powder, the display panel and the flat-type display device according to the fourth aspect of the present invention will be generically simply referred to as "fourth aspect of the present invention" for convenience hereinafter.

In the fourth aspect of the present invention, desirably, the temperature $T_{50}$ is at least 200° C., preferably at least 250° C., still more preferably at least 350° C., yet more preferably at least 400° C.

In the fourth aspect of the present invention, the temperature $T_{50}$ is defined, so that there can be obtained a phosphor powder improved in crystallinity and that there can be obtained a phosphor powder that does not easily deteriorate in continuous use for a long period of time, that is, which does not easily decrease in luminescence efficiency.

The above thermal quenching performance of the phosphor powder is called "temperature extinction characteristic". A phosphor powder is measured for luminescence efficiency at 25° C. (initial value of luminescence efficiency), the phosphor powder is measured for luminescence efficiency while the phosphor powder is heated, and the temperature $T_{50}$ can be determined on the basis of measurement results of such luminescence efficiency characteristics of the phosphor powder to temperature. In the actual continuous use of the phosphor powder for a long period of time, the initial value of the luminescence efficiency before measurement is restored when the temperature is brought back to 25° C.

In the phosphor powder according to the first to fourth aspects of the present invention, the phosphor powder includes a phosphor powder composition formed by dispersing, in a dispersing agent, the phosphor powder specified in any one of these embodiments.

The phosphor powder in the preferred embodiment of any one of the second to fourth aspects of the present invention or a phosphor powder obtained by a production method of a phosphor powder according to first to third aspects of the present invention to be described later comprises a host material (core material) made of elements coming under the groups II–VI of the periodic table, an activator and a co-activator, and when the amount ratio of the host material is 1 part by weight, preferably, the amount ratio of the activator is $1 \times 10^{-4}$ part by weight (100 ppm) to $1 \times 10^{-3}$ part by weight (1000 ppm), and the molar concentration of the co-activator is equal to the molar concentration of the activator. In this case, or in the first aspect of the present invention, when the amount ratio of the host material is 1 part by weight, desirably, the amount ratio of the activator is preferably $3 \times 10^{-4}$ part by weight (300 ppm) to $8 \times 10^{-4}$ part by weight (800 ppm), still more preferably $5 \times 10^{-4}$ part by weight (500 ppm) to $6 \times 10^{-4}$ part by weight (600 ppm). When the amount ratio of the activator is less than $1 \times 10^{-4}$ part by weight, a number of light emission centers is too small, and it is difficult to cause light emission. When the amount ratio of the activator exceeds $1 \times 10^{-3}$ part by weight, the amount of impurities that do not contribute to light emission increases, and the concentration extinction that is to decrease activation efficiency may take place. That the molar concentration of the co-activator is equal to the molar concentration of the activator, that is, that the number of atoms (atomic %) of the co-activator is equal to the number of atoms (atomic %) of the activator means that when the molar concentration of the activator is 1.00, the molar concentration of the co-activator is brought close to 0.95 to 1.05, preferably to 0.98 to 1.02, more preferably to as close as 1.00.

In the phosphor powder in the preferred embodiments of the second to fourth aspects of the present invention, and, further, in the production method of a phosphor powder according to the first to third aspects of the present invention to be described later, when the host material (core material) is made of elements coming under the groups II–VI of the periodic table, or in the first aspect of the present invention, there may be employed a constitution in which the elements for constituting the host material are zinc (Zn) and sulfur (S), the element for constituting the activator is silver (Ag), and the element for constituting the co-activator is aluminum (Al). The above phosphor powder emits light in blue. Alternatively, there may be employed a constitution in which the elements for constituting the host material are zinc (Zn) and sulfur (S), the element for constituting the activator is copper (Cu), and the element for constituting the co-activator is aluminum (Al). The above phosphor powder emits light in green.

The group II element for constituting the host material includes cadmium (Cd) in addition to zinc (Zn), and the group VI element includes selenium (Se) and tellurium (Te) in addition to sulfur (S). That is, the combination of the elements of II–VI groups for constituting the host material includes (Zn/S), (Zn/Se), (Zn/Te), (Zn/S,Se), (Zn/S,Te), (Zn/Se,Te), (Zn/S,Se,Te), (Cd/S), (Cd/Se), (Cd/Te), (Cd/S,Se), (Cd/S,Te), (Cd/Se,Te), (Cd/S,Se,Te), (Zn,Cd/S), (Zn,Cd/Se), (Zn,Cd/Te), (Zn,Cd/S,Se), (Zn,Cd/S,Te), (Zn,Cd/Se,Te) and (Zn,Cd/S,Se,Te).

The activator includes gold (Au) in addition to silver (Ag) and copper (Cu). In this case, the phosphor powder emits light in green. Further, the co-activator includes gallium (Ga) and indium (In) in addition to aluminum (Al).

As specific examples of the phosphor powder in the first aspect of the present invention, as specific examples of the phosphor powder in the preferred embodiments of the second to fourth aspects of the present invention, or as specific examples of the phosphor powder produced by the production method of a phosphor powder according to the first to third aspects of the present invention to be described later, the phosphor powder that emits light in blue includes [ZnS:Ag,Al] and [ZnS:Ag,Ga], the phosphor powder that emits light in green includes [ZnS:Cu,Al], [ZnS:Cu,Au,Al], [(Zn,Cd)S:Cu,Al], [(Zn,Cd)S:Ag,Al] and [Zn(S,Se):Ag,Al].

Further, as specific examples of the phosphor powder according to the second to fourth aspects of the present invention, or as specific examples of the phosphor powder produced by the production method of a phosphor powder according to the first to third aspects of the present invention to be described later, the phosphor powder that emits light in blue includes the above phosphor powders and also includes [ZnS:Ag], and the phosphor powder that emits light in green includes [$Zn_2SiO_4$:$Mn^{2+}$], [(Zn,Cd)S;Ag] and [(Zn,Cd)S:Cu]. Further, the phosphor powder that emits light in red includes [$Zn_3(PO_4)_2$:$Mn^{2+}$], [(Zn,Cd)S:Ag], [$YVO_4$:$Eu^{3+}$], [$Y_2O_2S$:$Eu^{3+}$] and [$Y_2O_3$:$Eu^{3+}$]. Further, the phosphor powder that emits light in reddish orange includes [$Y_2O_2S$:$Eu^{3+}$], and the phosphor powder that emits light in violet-blue includes [ZnS;Ag].

In the first to fourth aspects of the present invention, preferably, the chlorine concentration of a chlorine-containing compound (for example, NaCl) contained in the phosphor powder is not more than 20 ppm, or a detection limit of a measuring apparatus or less. The above chlorine-containing compound is used for decreasing the firing temperature in the firing step in the production method of a phosphor powder to be described later, and it is added in the step of mixing the host material with the activator and the co-activator. When the chlorine concentration of the chlorine-containing compound contained in the phosphor powder is too high, the crystallinity of the phosphor powder may decrease, so that the chlorine concentration is desirably of the above value or less.

The third aspect of the present invention can be combined with the second aspect of the present invention. That is, there can be employed a constitution in which the topmost-surface crystal-lattice-defect layer or the surface-damaged layer is removed from the surface of the phosphor powder immediately below the chemical-reaction layer. Alternatively, the fourth aspect of the present invention can be combined with the second aspect of the present invention. That is, there can be employed a constitution in which the topmost-surface crystal-lattice-defect layer or the surface-damaged layer is removed from the surface of the phosphor powder. Alternatively, the fourth aspect of the present invention can be combined with the third aspect of the present invention. That is, there can be employed a constitution in which the surface of the phosphor powder is coated with the chemical-reaction layer containing phosphoric acid.

The production method of a phosphor powder according to a first aspect of the present invention (to be sometimes referred to as "first aspect of the production method according to the present invention) is a production method which comprises preparing a host material by a solution-preparation step and a reaction step, then, mixing the host material with an activator and a co-activator, and then carrying out a firing step and a surface-treatment step, and the production method further comprises a removal step of removing a topmost-surface crystal-lattice-defect layer or a surface-damaged layer formed in the surface of the firing product between the firing step and the surface-treatment step.

In the production method according to the first aspect of the present invention, the topmost-surface crystal-lattice-defect layer or the surface-damaged layer is removed from the surface of the phosphor powder, so that the phosphor powder is improved in crystallinity, and that there can be obtained a phosphor powder that does not much deteriorate for a continuous use for a long period of time, that is, which does not much decrease in luminescence efficiency.

In the production method according to the first aspect of the present invention, the removal step can comprise an annealing treatment or an etching treatment. The temperature in the above annealing treatment is desirably lower than the firing temperature in the firing step. Further, the annealing treatment is preferably carried out in a reducing atmosphere or an inert gas atmosphere, from the viewpoint of preventing the oxidation of the phosphor powder. Otherwise, in the etching treatment, it is desirable to use, as an etching solution, a solution prepared by mixing a persaturated solution consisting of phosphoric acid (for example, hot phosphoric acid at 60° C.) into which $CrO_3$ is added, with concentrated hydrochloric acid in the persaturated solution: the concentrated hydrochloric acid mixing ratio of 1:2.

In the production method according to the first aspect of the present invention, preferably, a washing step is provided between the firing step and the removal step, and the firing product is washed such that the chlorine concentration of the chlorine-containing compound (for example, NaCl) contained in the phosphor powder is not more than 20 ppm, or a detection limit of a measuring apparatus or less. By the above procedure, the phosphor powder can be improved in crystallinity. In the surface-treatment step, preferably, the surface of the phosphor powder is coated with a chemical-reaction layer containing phosphoric acid. The chemical-reaction layer preferably has an average thickness of 1 nm to 5 nm, and further, the chemical-reaction layer is preferably made of zinc phosphate or calcium phosphate, whereby the phosphor powder can be also improved in crystallinity. For coating the surface of the phosphor powder with the chemical-reaction layer containing phosphoric acid, for example, a solution of a compound containing phosphoric acid is prepared, and the phosphor powder is immersed in the solution and then dried. The above description is also applicable to the production method of a phosphor powder according to the second or third aspect of the present invention to be described below.

The production method of a phosphor powder according to a second aspect of the present invention (to be sometimes referred to as "second aspect of the production method according to the present invention) is a production method which comprises preparing a host material by a solution-preparation step and a reaction step, then, mixing the host material with an activator and a co-activator, and then carrying out a firing step and a surface-treatment step, wherein the firing step is followed by a washing step, and the firing product is washed so that a chlorine-containing compound contained in the phosphor powder has a chlorine concentration of 20 ppm or less.

In the production method according to the second aspect of the present invention, preferably, the surface of the phosphor powder is coated with a chemical-reaction layer containing phosphoric acid in the surface-treatment step.

The production method of a phosphor powder according to a third aspect of the present invention (to be sometimes referred to as "third aspect of the production method according to the present invention) is a production method which comprises preparing a host material by a solution-preparation step and a reaction step, then, mixing the host material with an activator and a co-activator, and then carrying out a firing step and a surface-treatment step, wherein the surface of the phosphor powder is coated with a chemical-reaction layer containing phosphoric acid in the surface-treatment step.

The phosphor powders of the present invention can be used for constituting, for example, a cold cathode field emission display or the front panel (anode panel) thereof; a commercial (home-use), industrial (for example, a computer display), digital broadcasting or projection type cathode ray tube or a face plate thereof; or a plasma display or a rear panel thereof. The rear panel for an AC driven or DC driven plasma display comprises, for example, a support member; separation walls (ribs) formed on the support member; various electrodes (for example, data electrode) formed on the support member located between one separation wall and another separation wall; and a luminescent layer made of the phosphor powders formed between one separation wall and another separation wall. The front panel (anode panel) of the cold cathode field emission display and the face plate of the cathode ray tube will be discussed later.

The display panel of the present invention includes a so-called face plate of a commercial (home-use), industrial (for example, computer display), digital broadcasting or projection type cathode ray tube; or a front panel (anode panel) for a cold cathode field emission display. The face plate for a cathode ray tube generally comprises a glass panel (corresponding to the support member in the display panel of the present invention) and phosphor powders, and has luminescent layers formed on an inner surface of the glass panel in the form of stripes or dots; a black matrix formed on the inner surface of the glass panel between one luminescent layer and another luminescent layer; and a metal back layer (corresponding to the electrode in the display panel of the present invention) formed on the luminescent layers and the black matrix. The front panel (anode panel) of a cold cathode field emission display comprises a support member; luminescent layers made of the phosphor powders and formed in the form of stripes or dots (luminescent layers which are patterned in the form of stripes or dots, correspond to three primary colors, red (R), green (G) and blue (B), and are alternately arranged for a color display); and an anode electrode (corresponding to the electrode in the display panel of the present invention). A black matrix may be formed between one luminescent layer and another luminescent layer.

The display panel of the flat-type display device of the present invention includes the above-mentioned a front panel (anode panel) for a cold cathode field emission display. The cold cathode field emission display will be discussed later.

In the display panel of the present invention or the display panel of the flat-panel display device of the present invention, the luminescent layer can be formed by a screen printing method or a slurry method. In the screen printing method, the phosphor powder composition is printed on the support member (on the electrode and the support member in some cases), the applied composition is dried and fired, whereby the luminescent layer can be formed. In the slurry method, the phosphor powder composition containing a photosensitive polymer and being in the state of a slurry is applied to the support member (to the electrode and the support member in some cases) to form a coating film, and then, the photosensitive polymer is insolubilized to a developer solution by exposure to light, whereby the luminescent layer can be formed. For displaying three primary colors of (R,G,B), three phosphor powder compositions or three slurries are consecutively used, and the luminescent layers for emitting light in such three colors can be formed by the screen printing method or the slurry method.

In the phosphor powder composition, water can be used as a dispersing medium. The phosphor powder composition may contain polyvinyl alcohol as a dispersing agent or a retaining agent, and ammonium bichromate may be used as a photosensitive polymer. The phosphor powders of the present invention may be surface-treated on their manufacturing process, for improving the dispersing property and adhesion thereof.

An electron beam can be used as an energy beam for making the phosphor powders of the present invention emit light. The energy of the electron beam for irradiation of the phosphor powders is preferably set at 0.5 keV to 35 keV. In the above constitution, specifically, the phosphor powders can be used for constituting a cold cathode field emission display or a front panel (anode panel) thereof; or a commercial (home-use), industrial (for example, computer display), digital broadcasting or projection type cathode ray tube or a face plate thereof. Otherwise, there may be employed a constitution in which the energy of the electron beam for irradiation of the phosphor powders is 0.5 keV to 10 keV and the electron penetration depth from the surface of the phosphor powder is 0.5 $\mu$m or less. In the above constitution, specifically, the phosphor powders can be used for constituting a cold cathode field emission display or a front panel (anode panel) therefore. Otherwise, in the phosphor powders of the present invention, an ultraviolet ray can be used as an energy beam. In this case, preferably, the ultraviolet ray for irradiation of the phosphor powders has a wavelength of 100 nm to 400 nm. In the above constitution, specifically, the phosphor powders can be used for constituting a plasma display or a rear panel therefore.

When the flat-type display device of the present invention is constituted of a cold cathode field emission display, the material for constituting the anode electrode corresponding to the electrode can be properly selected depending upon the constitution of the cold cathode field emission display. That is, when the cold cathode field emission display is a transmission type (the display panel corresponds to a display screen), and when the anode electrode and the luminescent layer are stacked on the support member in this order, not only the support member but also the anode electrode itself is required to be transparent, and a transparent electrically conductive material such as indium-tin oxide (ITO) is used. When the cold cathode field emission display is a reflection type (the back panel corresponds to a display screen), or when the cold cathode field emission display is a transmission type and the luminescent layer and the anode electrode are stacked on the support member in this order, ITO can be used, and besides ITO, the material for the anode electrode can be properly selected from materials to be discussed later with respect of a cathode electrode or a gate electrode. When the anode electrode is constituted of aluminum (Al) or chromium (Cr), for example, the specific thickness of the anode electrode is $3 \times 10^{-8}$ m (30 nm) to $1.5 \times 10^{-7}$ m (150 nm), preferably $5 \times 10^{-8}$ m (50 nm) to $1 \times 10^{-7}$ m (100 nm). The anode electrode can be formed by a vapor deposition method or a sputtering method. The anode electrode may be an anode electrode having a form in which the effective field is covered with one sheet-shaped electrically conductive material or may be an anode electrode having a form in which anode electrode units each of which corresponds to one or a plurality of electron-emitting portions or one or a plurality of pixels are gathered. When the anode electrode has the former constitution, the anode electrode can be connected to the anode-electrode driving circuit. When the anode electrode has the latter constitution, for example, each anode electrode unit can be connected to the anode-electrode driving circuit. Examples of the constitution of the anode electrode and the luminescent layer include a constitution (1) in which the anode electrode is formed on the support member and the luminescent layer is formed on the anode electrode, and a constitution (2) in which the luminescent layer is formed on the support member and the anode electrode is formed on the luminescent layer. In the constitution (1), a so-called metal back film electrically connected to the anode electrode may be formed on the luminescent layer. In the constitution (2), a metal back layer may be formed on the anode electrode.

When the flat-type display device of the present invention is a cold cathode field emission display, or when the display panel of the present invention is the front panel (anode panel) of a cold cathode field emission display, ribs may be formed on the support member for preventing the occurrence of a so-called optical crosstalk, that is, electrons which collide with the luminescent layer are scattered backward and again collide with an adjacent luminescent layer to cause the adjacent luminescent layer to emit light. When the optical crosstalk occurs, a useless color is mixed with a color of light that should be emitted, so that the chromaticity decreases. With an increase in the acceleration voltage of electrons, the electrons are scattered backward to a greater extent. Therefore, desirably, the height of the ribs is determined by not only taking account of the thickness of the luminescent layer but also taking account of the backward scattering of electrons. The material for constituting the above ribs can be selected from known insulating materials, such as metal oxides, low melting glass or a material prepared by mixing low melting glass with a metal oxide such as alumina.

Examples of the method of forming the ribs include a screen printing method, a sand blasting method, a dry film method and a photo-sensitive method. The screen printing method refers to a method in which a screen has openings in its portions corresponding to the ribs to be formed, a rib-forming material on the screen is allowed to pass the openings with a squeezer to form rib-forming material layer on the support member, and the rib-forming material layer is calcined or sintered. The sand blasting method refers to a method in which a rib-forming material layer is formed on the support member, for example, by screen printing or with a roll coater, a doctor blade or a nozzle ejection coater, the formed rib-forming material layer is dried and then masked with a mask layer in portions where the ribs are to be formed, and then the exposed portions of the rib-forming material layer are removed by a sand blast method. The dry film method refers to a method in which a photosensitive film is laminated on the support member, the portions of the photosensitive film where the ribs are to be formed are removed by exposure and development, opening portions formed by the removal are filled with an insulating material layer, and the insulating material layer is calcined or sintered. The photosensitive film is combusted and removed by calcining or sintering, and the rib-forming insulating material layer filled in the opening portions remains and constitutes the ribs. The photo-sensitive method refers to a method in which a photosensitive rib-forming insulating material layer is formed on the support member, and the insulating material layer is patterned by exposure and development and then calcined or sintered. The material for constituting the ribs can be selected from known electrically conductive materials. In this case, the ribs can be formed by a plating method based on an electrically conductive material. The formed ribs may be polished to flatten the top surface of each rib. In the cold cathode field emission display, the front panel (anode panel) and the back panel (cathode panel) have a high vacuum in a space between them. Therefore, when no spacer is provided between the front panel (anode panel) and the back panel (cathode panel), the cold cathode field emission display may be damaged due to atmospheric pressure. The ribs in some cases work as a spacer holding portion for holding the spacer.

The form of the ribs includes the form of a lattice (grilles), that is, a form in which the rib surrounds the luminescent layer having a plan form of a nearly rectangle (or dot-shaped), and a stripe or band-like form that extends in parallel with opposite two sides of a rectangular or stripe-shaped luminescent layer. When the rib(s) have the form of a lattice, the rib may have a form in which the rib continuously or discontinuously surrounds four sides of one luminescent layer. When the rib(s) has the form of a stripe, the stripe may be continuous or discontinuous.

For improving the contrast of display images, preferably, a black matrix that absorbs light from the luminescent layer is formed between one luminescent layer and another adjacent luminescent layer and between the rib and the support member. As a material for constituting the black matrix, it is preferred to select a material that absorbs at least 99% of light from the luminescent layer. The above material includes carbon, a thin metal film (made, for example, of chromium, nickel, aluminum, molybdenum and an alloy of these), a metal oxide (for example, chromium oxide), metal nitride (for example, chromium nitride), a heat-resistant organic resin, a glass paste, and a paste containing a black pigment or electrically conductive particles of silver or the like. Specific examples thereof include a photosensitive polyimide resin, chromium oxide and a chromium oxide/chromium stacked film. Concerning the chromium oxide/chromium stacked film, the chromium film is to be in contact with the support member.

In the flat-type display device of the present invention, the substrate constituting the back panel or the support member constituting the display panel may be any substrate or any support member so long as they have a surface constituted of an insulating member. Examples of the substrate or the support member include various glass substrates such as an alkali-free glass substrate, a low-alkali glass substrate and a quartz glass substrate; a various glass substrates on which surface an insulating layer is formed; a quartz substrate; a quartz substrate on which surface an insulating layer is formed; and a semiconductor substrate on which surface an insulating layer is formed. From the viewpoint of decreasing a production cost, it is preferred to use a glass substrate or a glass substrate on which surface an insulating layer is formed.

In the flat-panel display device of the present invention, the back panel and the front panel can be bonded to each other in their circumferential portions with an adhesive or they can be bonded to each other with a combination of a frame made of an insulating rigid material such as glass or ceramic with an adhesive layer. When the frame and the adhesive layer are used in combination, a large distance between the back and display panels can be secured by selecting a proper height of the frame as compared with a case using an adhesive layer alone. While frit glass is generally used as an adhesive layer, a low-melting metal material having a melting point of 120 to 400° C. may be used.

The low-melting metal material includes indium (In, melting point 157° C.); an indium-gold-containing low-melting alloy; tin (Sn)-containing high-temperature solders such as $Sn_{80}Ag_{20}$ (melting point 220–370° C.) and $Sn_{95}Cu_5$ (melting point 227–370° C.); lead (Pb)-containing high-temperature solders such as $Pb_{97.5}Ag_{2.5}$ (melting point 304° C.), $Pb_{94.5}Ag_{5.5}$ (melting point 304–365° C.) and $Pb_{97.5}Ag_{10.5}Sn_{1.0}$ (melting point 309° C.); zinc (Zn)-containing high-temperature solders such as $Zn_{95}Al_5$ (melting point 380° C.); tin-lead-containing standard solders such as $Sn_5Pb_{95}$ (melting point 300–314° C.) and $Sn_2Pb_{98}$ (melting point 316–322° C.); and soldering materials such as $Au_{88}Ga_{12}$ (melting point 381° C.). All of the above subscript values show atomic %.

In the flat-panel display device of the present invention, when the back panel, the display panel and the frame are bonded, these members may be bonded at the same time, or one of the panels and the frame may be bonded in advance at a first step and the other panel may be bonded to the frame at a second step. When these three members are bonded at the same time or the other panel is bonded to the frame at the second step in a vacuum atmosphere, the space surrounded by the back panel, the display panel and the frame comes to be a vacuum concurrently with the bonding. Otherwise, the space surrounded by the back panel, the display panel and the frame may be evacuated to form a vacuum space after these three members are bonded. When the evacuation is carried out after the bonding, the atmosphere for the bonding may have atmospheric pressure or reduced pressure, and the gas constituting the atmosphere may be ambient atmosphere or an inert gas containing nitrogen gas or a gas coming under the group 0 of the periodic table (for example, Ar gas).

When the evacuation is carried out after the bonding, the evacuation can be carried out through a tip tube pre-connected to the back panel and/or the display panel. Typically, the tip tube is made of a glass tube and is bonded to a circumference of a through hole formed in an ineffective field of the back panel and/or the display panel with frit glass or the above low-melting metal material. After the space reaches a predetermined vacuum degree, the tip tube is sealed by thermal fusion. When the entire flat-panel display device is once heated and then temperature-decreased before the sealing, properly, a residual gas can be released into the space, and the residual gas can be removed out of the space by the evacuation.

BRIEF DESCRIPTION OF DRAWINGS

FIG. 4 is a schematic partial end view of a cold cathode field emission display as a flat-type display device in Example 1.

FIG. 8B, are schematic partial end views of the substrate, etc., for explaining the production method of the field emission device constituted of a Spindt-type field emission device in Example 1.

FIG. 10B, are schematic partial cross-sectional views of the substrate, etc., for explaining the production method of the plane-type cold cathode field emission device (No. 1).

FIG. 15C, are schematic partial end views of the face plate, etc., for explaining the production method of the glass bulb for a color image-receiving tube.

BEST MODE FOR CARRYING OUT THE INVENTION

The present invention will be explained on the basis of Examples with reference to drawings hereinafter.

EXAMPLE 1

Example 1 is concerned with the first and fourth aspects of the present invention, and further is concerned with the production method of a phosphor powder according to the second aspect of the present invention.

In Example 1, there was prepared a phosphor powder-1 which was to emit light in blue and was composed of ZnS as a host material (core material) made of elements coming under the groups II–VI of the periodic table, Ag as an activator and Al as a co-activator. Further, for comparison, a phosphor powder-A was prepared. Table 1 shows compositions and property values of these phosphor powders. In Table 1, the amount ratio of the activator shown by part by weight is a value when the amount ratio of the host material is 1 part by weight, and the unit of the amount ratio of the activator is $10^{-4}$ part by weight. The "amount ratio" of the co-activator refers to a molar concentration of the co-activator when a molar concentration of the activator is 1.00. Further, the unit of the chlorine concentration is ppm, and the temperature $T_{50}$ at which the luminescence efficiency comes to be ½ of the luminescence efficiency at 25° C. in the thermal quenching performance is ° C.

TABLE 1

|  | Phosphor powder | |
| --- | --- | --- |
|  | 1 | A |
| Host material | ZnS | |
| Activator | Ag | |
| part by weight | 5.80 | 1.80 |
| Co-activator | Al | |
| amount ratio | 1.03 | 0.22 |
| Color of emitted light | Blue | |
| Chlorine concentration | ≦20 | 70 |
| Temperature $T_{50}$ | 230 | 160 |

Figure 1:
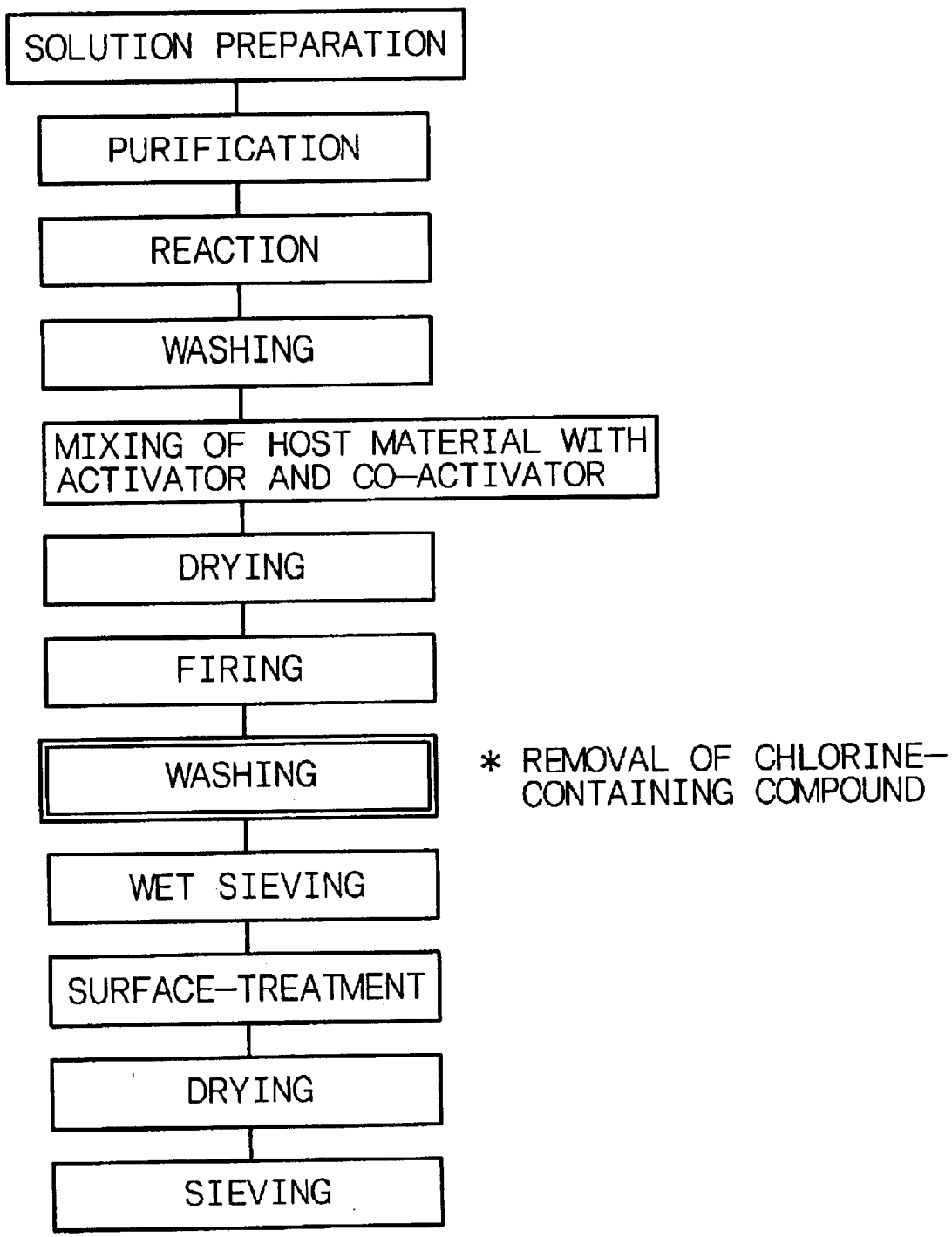
FIG. 1 is a flow chart for explaining the outline of a production method of a phosphor powder in Example 1.

The production method of a phosphor powder in Example 1 will be outlined below with reference to the flow chart of FIG. 1.

First, a solution is prepared. Specifically, a ZnO powder is dissolved in an $H_2SO_4$ solution to prepare a $ZnSO_4$ solution. Then, the $ZnSO_4$ solution is purified to remove impurities, particularly, heavy metals from the $ZnSO_4$ solution.

Then, a reaction step is carried out. Specifically, the $ZnSO_4$ solution and an $H_2S$ gas are allowed to react to obtain ZnS particles. Then, the ZnS particles are washed and dried to obtain a ZnS phosphor powder (ZnS phosphor particles) that is a host material.

The above ZnS powder that is a host material, an activator, a co-activator and a chlorine-containing compound (specifically, NaCl) are mixed, and the mixture is dried and then subjected to a firing step. The chlorine-containing compound is added for decreasing the firing temperature in the firing step. Specifically, the firing was carried out in an inert gas atmosphere at a temperature of 800° C. to 1000° C., to give a fired product. In a washing step, the fired product was washed until the chlorine concentration of the chlorine compound (NaCl) contained in the phosphor powder came to be 20 ppm or less (specifically, the detection limit or less of a measuring apparatus). Then, the fired product was dispersed in a solvent and classified by wet sieving, and the sieved product was surface-treated as required for improving dispersibility and adhesion, then dried and classified by sieving, to give a phosphor powder.

Figure 9A:
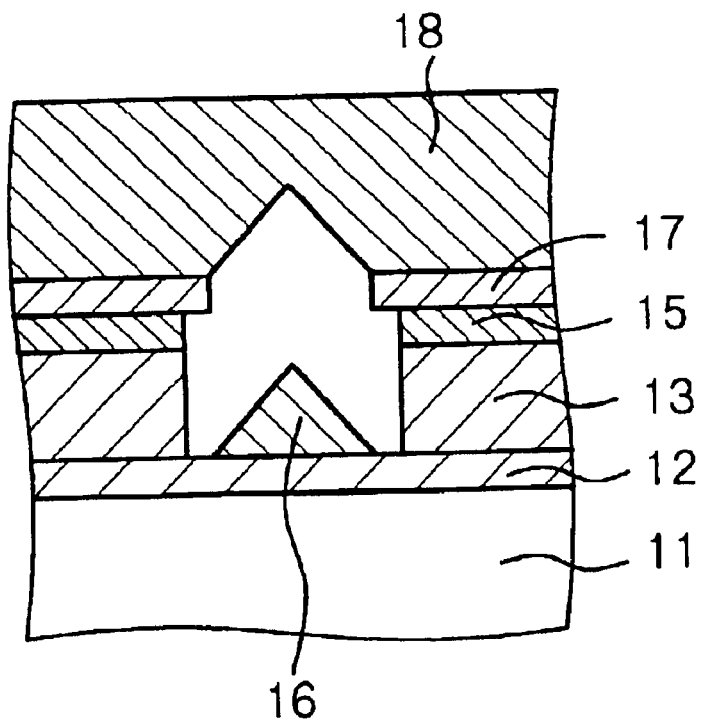
FIGS. 9A and 9B, following
Figure 9B:
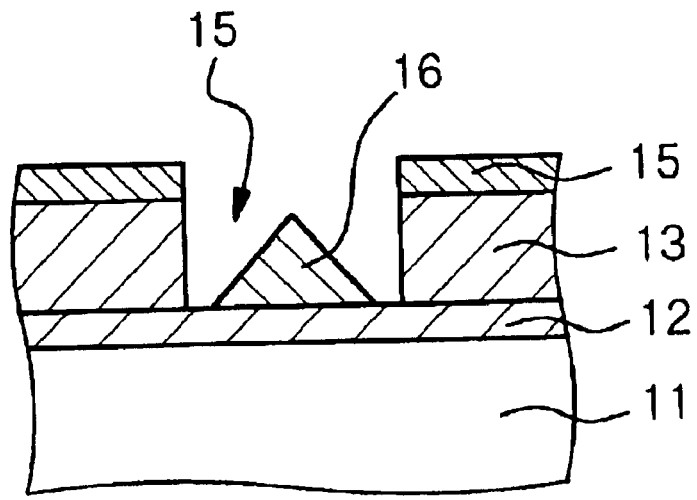

In Example 1, as a flat-panel display device, the cold cathode field emission display having cold cathode field emission devices (to be referred to as "field emission device" hereinafter) of Spindt-type was manufactured as a trial. The flat-panel display device of Example 1 had a cross-section similar to the schematic partial cross-sectional view shown in FIG. 4. In the flat-panel display device, a display panel 20 and a back panel 10 having a plurality of electron-emitting regions are arranged so as to face each other through a vacuum space. Each electron-emitting region has a plurality of Spindt-type field emission devices. As shown in the schematic partial end view of FIG. 9B, the Spindt-type field emission device comprises a substrate 11; a stripe-shaped cathode electrode 12 formed on the substrate 11; an insulating layer 13 formed on the substrate 11 and the cathode electrode 12; a stripe-shaped gate electrode 14 formed on the insulating layer 13; an opening portion 15 penetrating through the gate electrode 14 and the insulating layer 13; and a conical electron-emitting portion 16 formed on a portion of the cathode electrode 12 which portion is positioned in the bottom portion of the opening portion 15. In FIG. 9B, one Spindt-type field emission device is shown for convenience. The projection image of the stripe-shaped cathode electrode 12 and the projection image of the stripe-shaped gate electrode 14 extend in different directions (for example, in directions which across at right angles). The electron-emitting region is positioned in an overlapping region where the projection image of the stripe-shaped gate electrode 14 and the projection image of the stripe-shaped cathode electrode 12 overlap. The electron-emitting portion 16 is formed on a portion of the cathode electrode 12 which portion is positioned in the bottom portion of the opening portion 15. Many such electron-emitting portions 16 correspond to one of luminescent layers 22. A relatively negative voltage (video signal) is applied to the electron-emitting portion 16 from a cathode-electrode driving circuit 31 through the cathode electrode 12, and a relatively positive voltage (scanning signal) is applied to the gate electrode 14 from a gate-electrode driving circuit 32. Due to an electric field generated by the application of the above voltages, electrons are emitted from the top portion of the electron-emitting portion 16 exposed in the bottom portion of the opening portion 15 on the basis of a quantum tunnel effect. In some cases, reversibly to the above, the scanning signal may be inputted to the cathode electrode 12 and the video signal may be inputted to the gate electrode 14.

The display panel 20 comprises a support member 21 made of glass or the like; a plurality of luminescent layers (phosphor layers) 22 formed on the support member 21 and formed in the form of a matrix or dots; a black matrix 23 filled between the luminescent layers 22; and an electrode (anode electrode 24) formed on the entire surfaces of the luminescent layers 22 and the black matrix 23. The luminescent layers (phosphor layers) 22 are formed of the above various phosphor powders which emit light upon irradiation with electrons flying from the electron-emitting region. A positive voltage higher than the positive voltage applied to the gate electrode 14 is applied to the anode electrode 24 from an anode-electrode driving circuit 33, and the anode electrode 24 works to lead electrons emitted into the vacuum space from the electron-emitting portion 16 toward the luminescent layer 22. Further, the anode electrode 24 works not only to protect the phosphor powders constituting the luminescent layer 22 against sputtering by particles such as ions, but also to reflect light emitted from the luminescent layers 22 due to electron excitation to the support member side so that the display screen observed from an outside of the support member 21 is improved in luminescence efficiency. The anode electrode 24 is formed, for example, of a thin aluminum (Al) film or a thin chromium (Cr) film. The luminescent layers 22 and the anode electrode 24 can be arranged as shown in FIGS. 5A, 5B and 5C or FIGS. 6A, 6B and 6C.

Figure 5A:
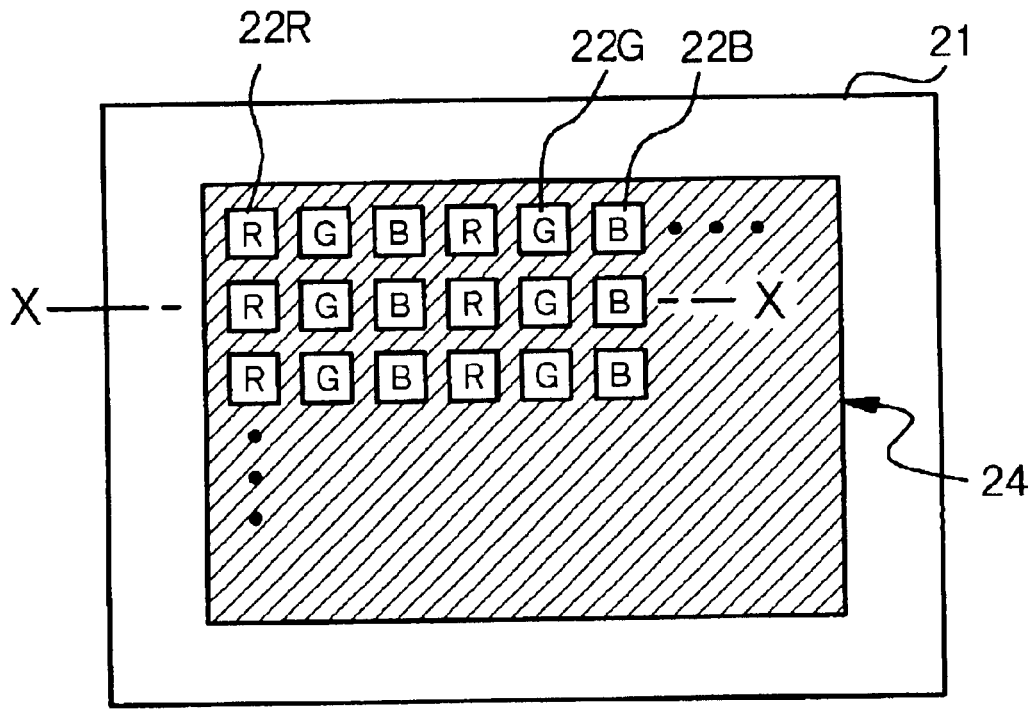
FIG. 5A is a schematic plan view of a display panel having luminescent layers arranged in a matrix form.
Figure 5B:
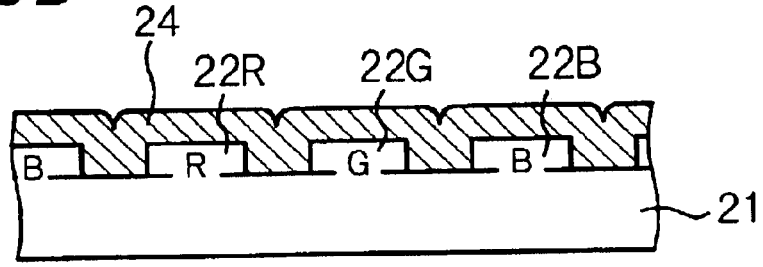
FIGS. 5B and 5C are schematic partial cross-sectional views thereof.
Figure 5C:
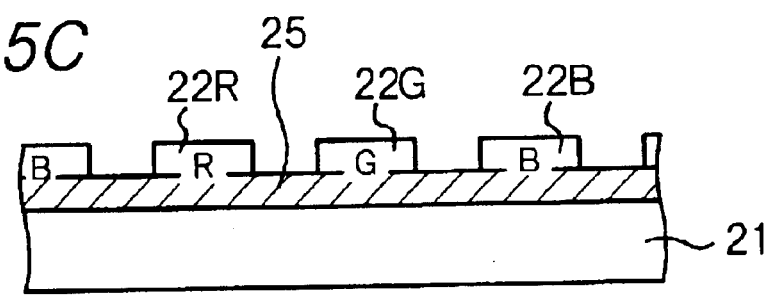
Figure 6A:
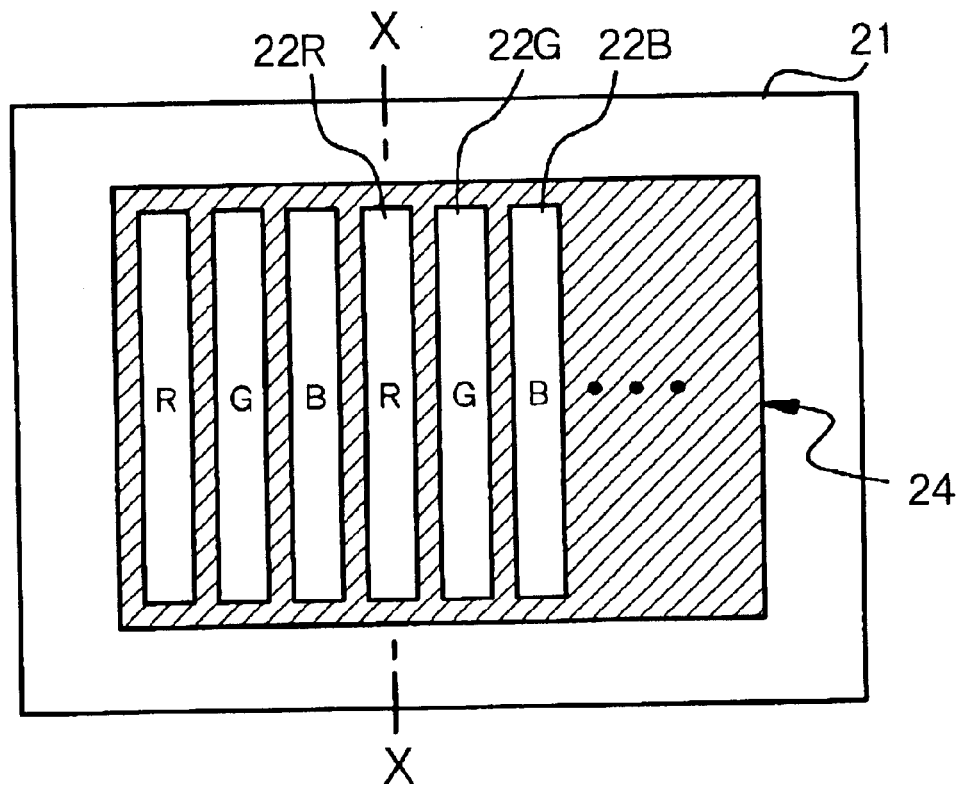
FIG. 6A is a schematic plan view of a display panel having luminescent layers arranged in the form of a stripe.
Figure 6B:
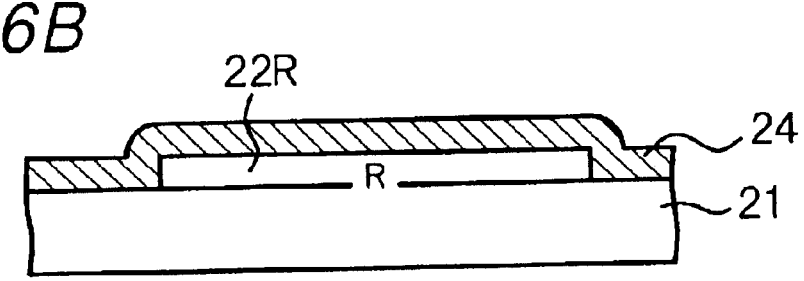
FIGS. 6B and 6C are schematic partial cross-sectional views thereof.
Figure 6C:
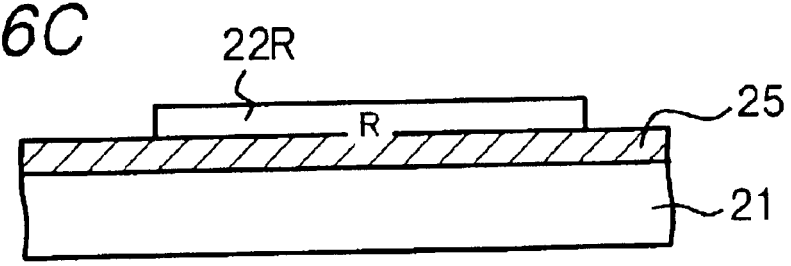
Figure 7A:
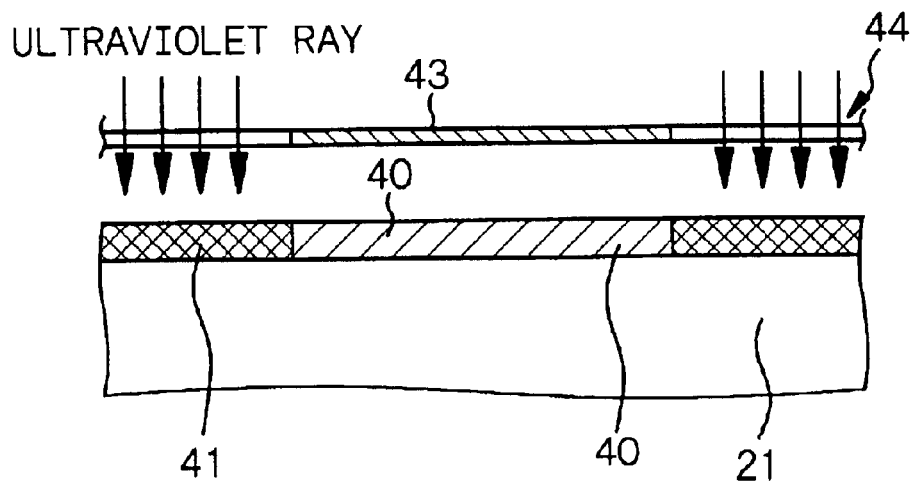
FIGS. 7A to 7D are schematic partial end views of a support member, etc., for explaining one example of a production method of a display panel.
Figure 7B:
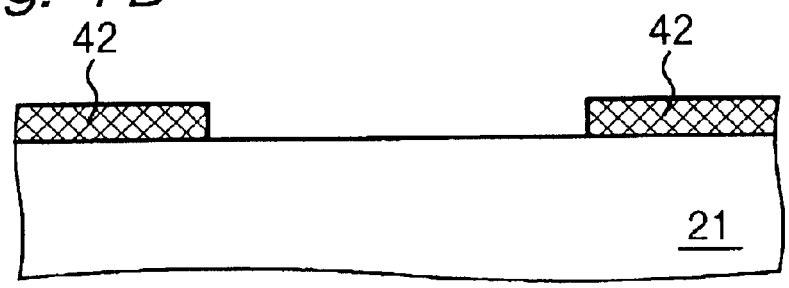
Figure 7C:
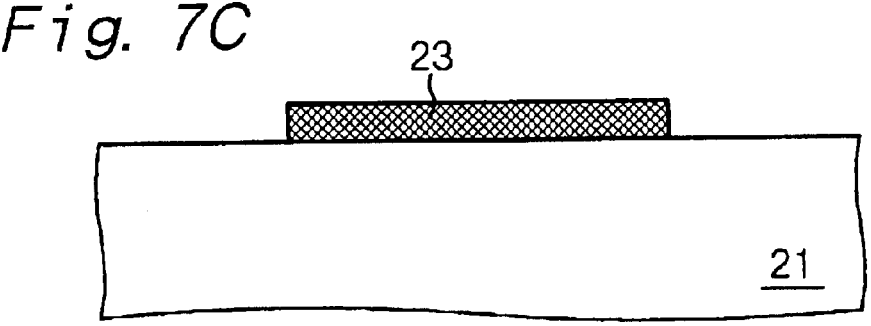
Figure 7D:
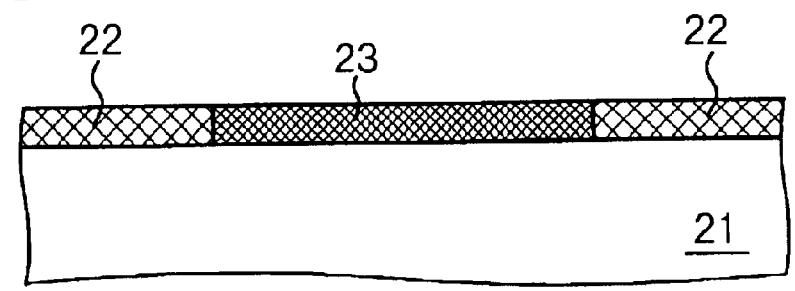
Figure 8A:
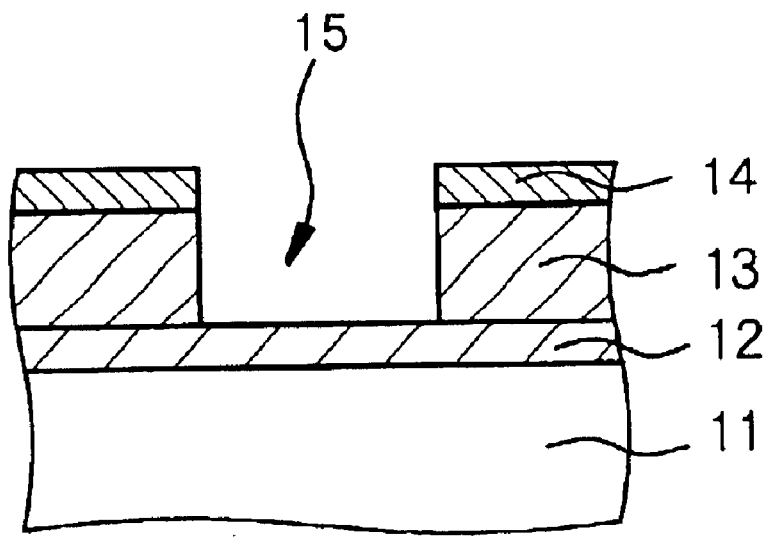
FIGS. 8A and 8B are schematic partial end views of a substrate, etc., for explaining a production method of a field emission device constituted of a Spindt-type field emission device in Example 1.
Figure 8B:
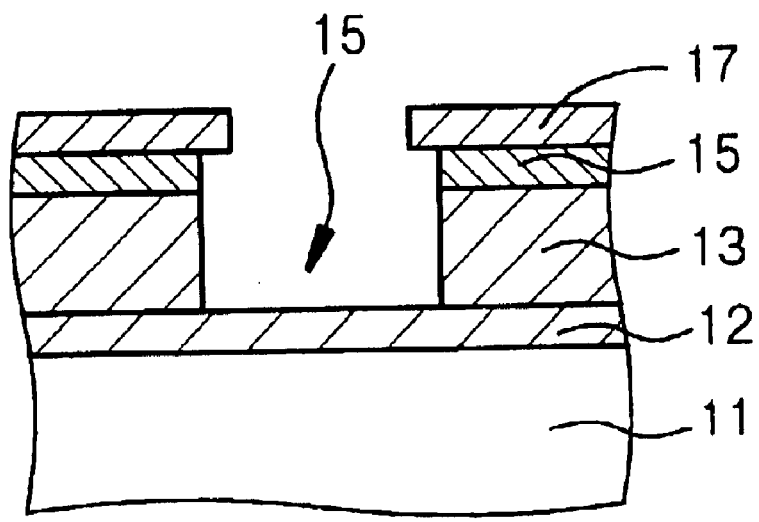

One example of the method for producing the display panel shown in FIGS. 5A and 5B will be explained with reference to FIGS. 7A to 7D. First, a phosphor powder composition is prepared. For this purpose, for example, a dispersing agent is dispersed in purified water, and the dispersion is stirred with a homomixer at 3000 rpm for 1 minute. Then, the above-explained phosphor powders are placed in the purified water in which the dispersing agent has been dispersed, and the mixture is stirred with a homomixer at 5000 rpm for 5 minutes. Then, for example, polyvinyl alcohol and ammonium bichromate are added, and the mixture is fully stirred and then filtered.

In the production of the display panel (anode panel) 20, a photosensitive film 40 is formed (applied) on the entire surface of the support member 21 made, for example, of glass. Then, the photosensitive film 40 formed on the support member 21 is exposed to light which has been irradiated from a light source (not shown) and has passed through an opening 44 formed in a mask 43, to form an exposed region 41 (see FIG. 7A). Then, the photosensitive film 40 is developed to remove it selectively, whereby a remaining portion (exposed and developed photosensitive film) 42 is retained on the support member 21 (see FIG. 7B). Then, a carbon agent (carbon slurry) is applied to the entire surface, dried and calcined or sintered, and the remaining portion 42 of the photosensitive film and the carbon agent thereon are removed by a lift-off method, to form a black matrix 23 made of the carbon agent on the exposed support member 21 and also to remove the remaining portion 42 of the photosensitive film (see FIG. 7C). Then, each of the luminescent layers 22 for red, green and blue is formed on the exposed support member 21 (see FIG. 7D). Specifically, the phosphor powder compositions prepared from the phosphor powders (phosphor particles) manufactured by the same method as that described above are used. For example, a blue photosensitive phosphor powder composition (phosphor slurry) can be applied to the entire surface, exposed to light and developed, then, a green photosensitive phosphor powder composition (phosphor slurry) can be applied to the entire surface, exposed to light and developed, and then a red photosensitive phosphor powder composition (phosphor slurry) is applied to the entire surface, exposed to light and developed. Then, the anode electrode 24 made of a thin aluminum film having a thickness of approximately 0.07 $\mu$m is formed on the luminescent layers 22 and the black matrix 23 by a sputtering method. Alternatively, each luminescent layer 22 can be formed by a screen printing method and the like.

The method for producing the Spindt-type field emission device will be explained below. The method for producing the Spindt-type field emission device is basically a method of forming the conical electron-emitting portion 16 by perpendicular deposition of a metal material. That is, deposition particles enter perpendicularly to the opening portion 15, and the amount of the deposition particles which reach the bottom portion of the opening portion 15 is gradually decreased by utilizing the masking effect of an overhanging deposit formed near the opening portion 15, whereby the electron-emitting portion 16 as a conical deposit is formed in a self-aligned manner. The method for producing a flat-panel display device, which is a cold cathode field emission display having the Spindt-type field emission device, according to a method in which a peel layer 17 is formed on the insulating layer 13 and the gate electrode 14 beforehand for making it easy to remove an unnecessary overhanging deposit will be outlined with reference to FIGS. 8A, 8B, 9A and 9B showing schematic partial end views of the substrate and the like. One electron-emitting portion is shown in the drawings for explaining the field emission device or explaining the production method thereof.

Step-100

First, the cathode electrode 12 made of niobium (Nb) in the form of a stripe is formed on the substrate 11 made, for example, of glass, and the insulating layer 13 made of $SiO_2$ is formed on the entire surface. Further, the gate electrode 14 in the form of a stripe is formed on the insulating layer 13. The gate electrode 14 in the form of a stripe can be formed, for example, by a sputtering method, lithography and a dry etching method. Then, the opening portion 15 is formed in the gate electrode 14 and the insulating layer 13 by a reactive ion-etching (RIE) method, to expose the cathode electrode 12 in a bottom portion of the opening portion 15 (see FIG. 8A). The cathode electrode 12 may be a single-material layer, or it may be a stack of a plurality of material layers. For suppressing the fluctuation of electron emission characteristics of the electron-emitting portions to be formed at a step to come later, the surface layer portion of the cathode electrode 12 can be made of a material having a higher electric resistivity than a material forming the remaining portion. The stripe-shaped cathode electrode 12 extends leftward and rightward on a paper surface of the drawings, and the stripe-shaped gate electrode 14 extends in the direction perpendicular to the paper surface of the drawings. The gate electrode 14 can be formed by a known thin film forming method such as a PVD method including a vapor deposition method and the like, a CVD method, a plating method including an electroplating method and an electroless plating method, a screen printing method, a laser abrasion method, a sol-gel method, a lift-off method, and the like, or a combination of one of them with an etching method as required. For example, a stripe-shaped gate electrode can be directly formed when a screen-printing method or a plating method is employed.

Step-110

Then, the electron-emitting portion 16 is formed on the cathode electrode 12 exposed in the bottom portion of the opening portion 15. Specifically, while rotating the substrate 11, aluminum is obliquely deposited on the entire surface to form the peel layer 17. In this case, it is arranged to make a sufficiently large incidence angle of vaporized particles with regard to a normal of the substrate 11 (for example, the incident angle is set at 65–85 degrees), whereby the peel layer 17 can be formed on the gate electrode 14 and the insulating layer 13 almost without depositing aluminum in the bottom portion of the opening portion 15. The peel layer 17 extends from the opening edge portion of the opening portion 15 like eaves, whereby the opening portion 15 is substantially decreased in diameter (see FIG. 8B).

Step-120

Then, for example, molybdenum (Mo) is vertically deposited on the entire surface. In this case, as shown in FIG. 9A, with the growth of an electrically conductive layer 18 made of molybdenum having an overhanging form on the peel layer 17, the substantial diameter of the opening portion 15 is gradually decreased, so that vaporized particles which contribute to deposition in the bottom portion of the opening portion 15 gradually come to be limited to particles which pass by the center of the opening portion 15. As a result, a conical deposit is formed on the bottom portion of the opening portion 15, and the conical deposit made of molybdenum constitutes the electron-emitting portion 16.

Then, the peel layer 17 is peeled off from the insulating layer 13 and the gate electrode 14 by an electrochemical process and a wet process, to selectively remove the electrically conductive layer 18 over the insulating layer 13 and the gate electrode 14. As a result, as shown in FIG. 9B, the conical electron-emitting portion 16 can be retained on the cathode electrode 12 positioned in the bottom portion of the opening portion 15.

Step-130

The back panel (cathode panel) 10 having such field emission devices formed in a large number and the display panel (anode panel) 20 are combined, whereby the flat-panel display device shown in FIG. 4 can be obtained. Specifically, an approximately 1 mm high frame (not shown) made, for example, of ceramic or glass is prepared, the frame, the back panel 10 and the display panel 20 are bonded, for example, with frit glass, and the frit glass is dried, then followed by calcining or sintering the frit glass at approximately 450° C. for 10 to 30 minutes. Then, the inner space of the flat-panel display device is evacuated until it has a vacuum degree of approximately $10^{-4}$ Pa, and then the inner space is sealed by a proper method. Alternatively, the frame, the back panel 10 and the display panel 20 may be bonded in a high-vacuum atmosphere. Alternatively, for some structure of the flat-panel display device, the back panel 10 and the display panel 20 may be bonded to each other without the frame.

The above-produced cold cathode field emission display as a flat-type display device and a cold cathode field emission display as a flat-type display device using a conventional phosphor powder were tested for changes of luminescence efficiency with elapse of the time. As a result, it was found that the initial value of luminescence efficiency with the phosphor powder-1 was approximately 15% larger than the initial value of luminescence efficiency with the phosphor powder-A. Further, when the time period for which the luminescence efficiency came to be ½ of the initial value of the luminescence efficiency was assumed to be a phosphor powder lifetime, the phosphor powder lifetime of the phosphor powder-1 was approximately twice as long as the phosphor powder lifetime of the phosphor powder-A.

EXAMPLE 2

Figure 2:
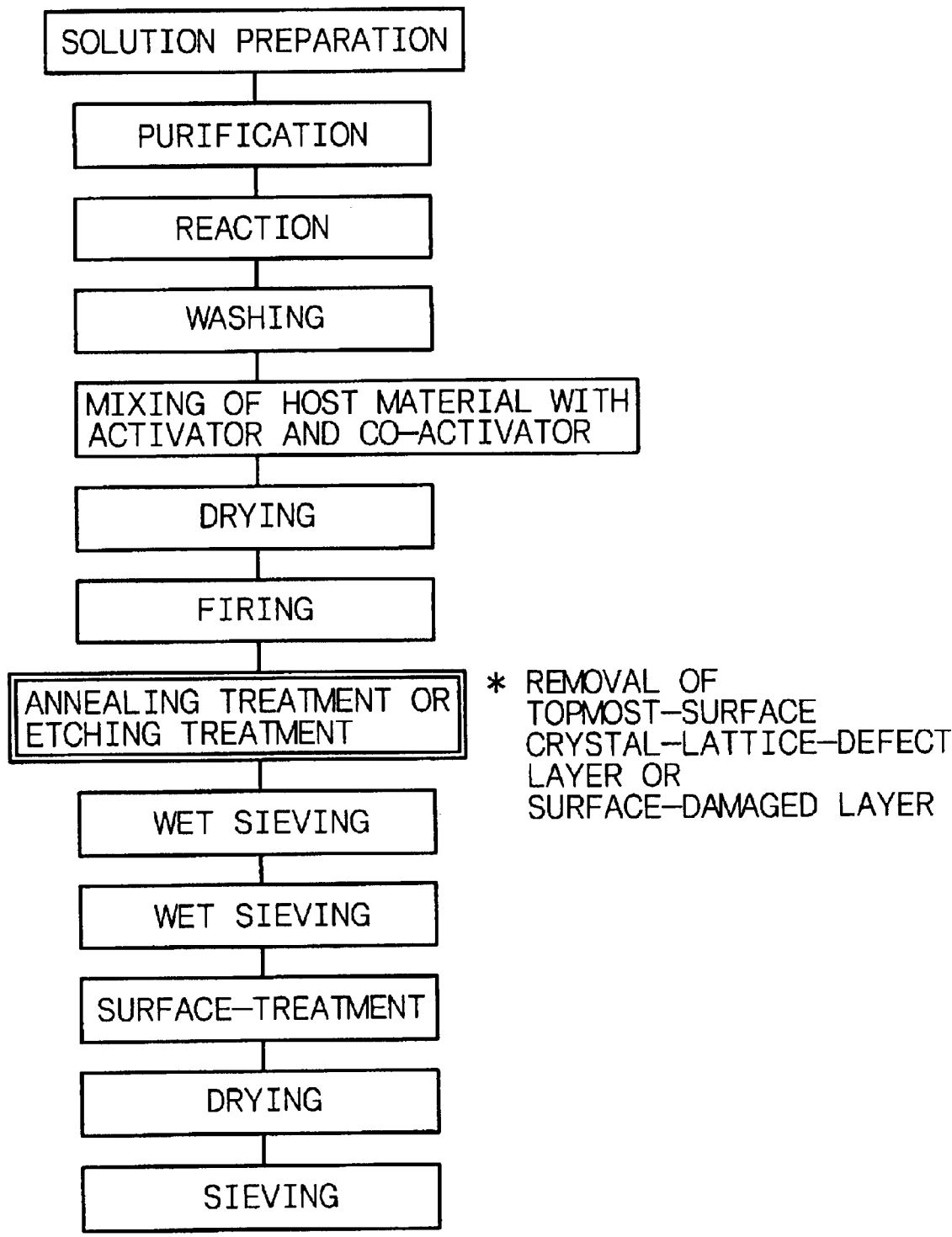
FIG. 2 is a flow chart for explaining the outline of a production method of a phosphor powder in Example 2.

Example 2 is concerned with the second aspect of the present invention and the production method of a phosphor powder according to the first aspect of the present invention. In Example 2, a topmost-surface crystal-lattice-defect layer or a surface-damaged layer is removed from the surface of the phosphor powder. FIG. 2 shows a flow chart of the production method of a phosphor powder in Example 2.

A phosphor powder-2 that emitted light in blue in Example 2 had the same composition as that of the phosphor powder-1 shown in Table 1.

The phosphor powder in Example 2 is produced in the same manner as in the production method of a phosphor powder explained in Example 1 except that a removal step of removing a topmost-surface crystal-lattice-defect layer or a surface-damaged layer formed on the fired product is provided between the firing step and the surface-treatment step. The above removal step comprises an annealing treatment. The temperature for the annealing treatment is lower than the firing temperature in the firing step. Specifically, the annealing treatment was carried out in a reducing atmosphere (more specifically, in an atmosphere of $H_2/N_2$ gas) at a temperature of 500° C. to 600° C.

A cold cathode field emission display having field emission devices, as flat-type display device, was prepared as a trial in the same manner as in Example 1, and the cold cathode field emission display was measured for a relationship between an electron beam integration dose (integration dose of electron beam until the luminescence efficiency came to be ½ of the initial luminescence efficiency) and the luminescence efficiency. As a result, when the electron beam integration dose of the phosphor powder-A was assumed to be 1, the electron beam integration dose of the phosphor powder-2 was approximately 4.

Further, with regard to a phosphor powder obtained by carrying out an etching treatment as the removal step using, as an etching solution, a solution prepared by mixing a persaturated solution consisting of phosphoric acid (hot phosphoric acid at 60° C.) into which $CrO_3$ is added, with concentrated hydrochloric acid in the persaturated solution-:the concentrated hydrochloric acid mixing ratio of 1:2, a similar result was also obtained.

EXAMPLE 3

Figure 3:
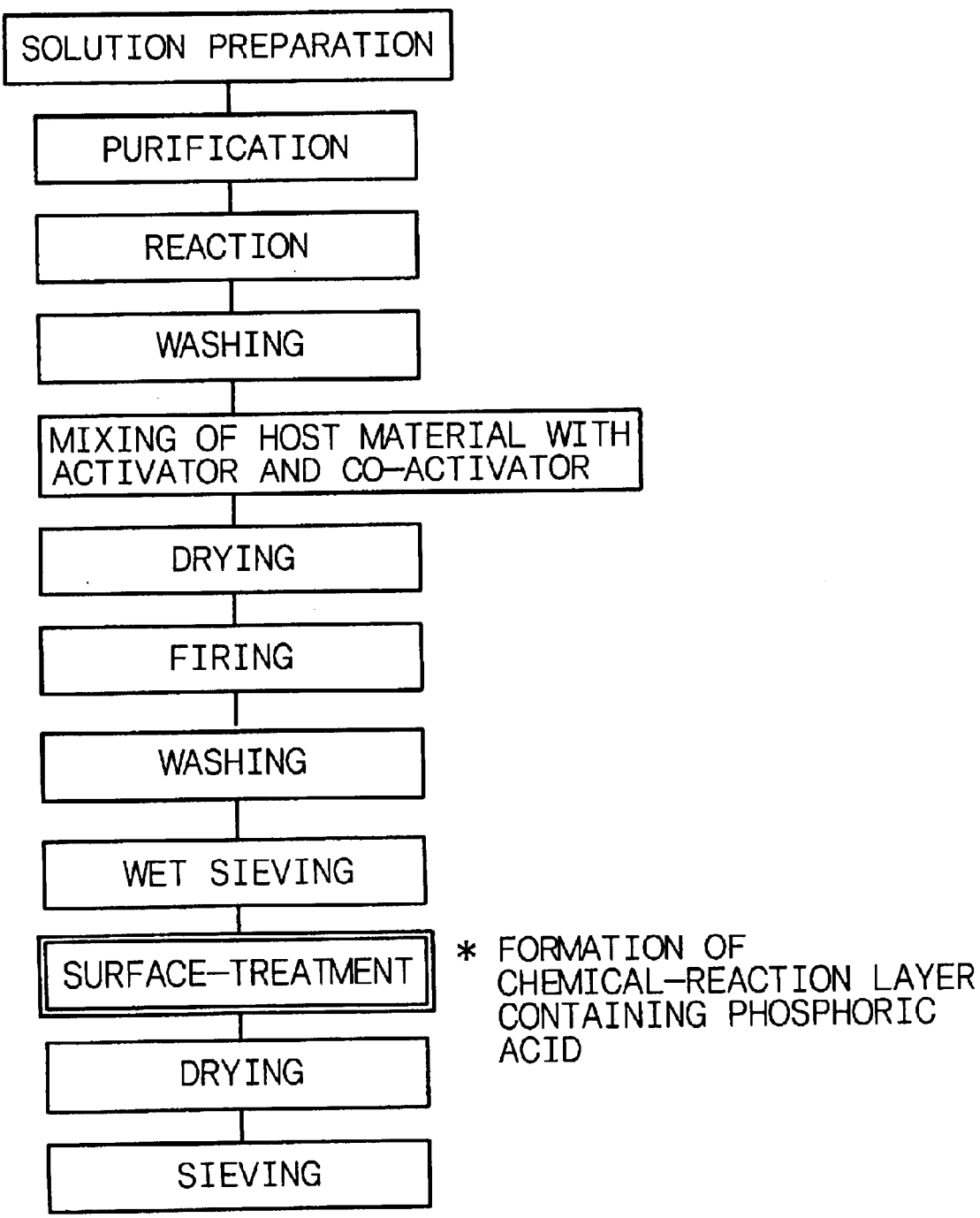
FIG. 3 is a flow chart for explaining the outline of a production method of a phosphor powder in Example 3.

Example 3 is concerned with the third aspect of the present invention and the production method of a phosphor powder according to the third aspect of the present invention. FIG. 3 shows a flow chart of the production method of a phosphor powder in Example 3.

In Example 3, the surface of the phosphor powder is coated with a chemical-reaction layer (chemical reacted layer or compound layer, and specifically, zinc phosphate) having an average thickness of 2 nm–3 nm and containing phosphoric acid.

The phosphor powder-3 that emitted light in blue in Example 3 had the same composition as that of the phosphor powder-1 in Example 1 shown in Table 1.

The phosphor powder in Example 3 is obtained by coating the surface of the phosphor powder with the chemical-reaction layer containing phosphoric acid in the surface-treatment step in the production method of a phosphor powder in Example 1. Specifically, a solution of a compound containing phosphoric acid (solution of zinc phosphate) was prepared, and the phosphor powders were immersed in the solution and then dried.

For comparison, a phosphor powder-A' was prepared by a method in the same manner as in the preparation of the phosphor powder-A except that the surface-treatment step was carried out according to a method in which silica was allowed to adhere to the surface of the phosphor powder by a sol-gel method. Further, a phosphor powder-A" was prepared in the same manner as in the preparation of the phosphor powder-A except that the surface-treatment step was carried out according to a method in which powdered silica was allowed to adhere to the surface of the phosphor powder by mixing.

Cold cathode field emission displays having field emission devices, as flat-type display device, were prepared in the same manner as in Example 1, and each cold cathode field emission display was measured for a relationship between an electron beam integration dose (integration dose of electron beam until the luminescence efficiency came to be ½ of the initial luminescence efficiency) and the luminescence efficiency. As a result, when the electron beam integration dose of the phosphor powder-A' was assumed to be 1, the electron beam integration dose of the phosphor powder-A" was approximately 1.3, and the electron beam integration dose of the phosphor powder-3 was approximately 3.

When the chemical-reaction layer containing phosphoric acid was calcium phosphate, a similar result was also obtained. When phosphor powder was subjected to the removal step of removing a topmost-surface crystal-lattice-defect layer or a surface-damaged layer formed on the fired product in the same manner as in Example 2, the phosphor powder showed an electron beam integration dose of approximately 5.

Various Field Emission Devices

Various field emission devices and the production methods thereof will be explained below. Flat-type display devices (cold cathode field emission displays) using these field emission devices can have the same constitution as that of the flat-type display device (cold cathode field emission display) explained in Example 1.

A field emission device constituting a so-called three-electrodes-type cold cathode field emission display (to be referred as "display", unless otherwise specified) can be specifically classified, for example, into the following two categories depending upon the structure of the electron-emitting portion. That is, a field emission device having a first structure comprises;

(A) a stripe-shaped cathode electrode which is formed on a substrate and extends in a first direction, (B) an insulating layer formed on the substrate and the cathode electrode, (C) a stripe-shaped gate electrode which is formed on the insulating layer and extends in a second direction different from the first direction, (D) a first opening portion formed in the gate electrode and a second opening portion formed in the insulating layer and communicating with the first opening portion, and (E) an electron-emitting portion formed on the cathode electrode positioned in the bottom portion of the second opening portion, and said field emission device has a structure in which the electron-emitting portion exposed in the bottom portion of the second opening portion is for emitting electrons.

The field emission device having the above first structure includes the above-mentioned Spindt-type field emission device (field emission device having a conical electron-emitting portion formed on the cathode electrode positioned in the bottom portion of the second opening portion), and a plane-type field emission device (field emission device having a nearly flat electron-emitting portion formed on the cathode electrode positioned in the bottom portion of the second opening portion).

A field emission device having a second structure comprises;

(A) a stripe-shaped cathode electrode which is formed on a substrate and extends in a first direction, (B) an insulating layer formed on the substrate and the cathode electrode,
(C) a stripe-shaped gate electrode which is formed on the insulating layer and extends in a second direction different from the first direction, and
(D) a first opening portion formed in the gate electrode and a second opening portion formed in the insulating layer and communicating with the first opening portion, said field emission device has a structure in which a portion of the cathode electrode which portion is exposed in the bottom portion of the second opening portion corresponds to the electron-emitting portion and the portion of the cathode electrode which portion is exposed in the bottom portion of the second opening portion is for emitting electrons.

The field emission device having the above second structure includes a flat-type field emission device which emits electrons from the flat surface of the cathode electrode.

In the Spindt-type field emission device, the material for constituting an electron-emitting portion may include at least one material selected from the group consisting of tungsten, a tungsten alloy, molybdenum, a molybdenum alloy, titanium, a titanium alloy, niobium, a niobium alloy, tantalum, a tantalum alloy, chromium, a chromium alloy and impurity-containing silicon (polysilicon or amorphous silicon). The electron-emitting portion of the Spindt-type field emission device can be formed by, for example, a vapor deposition method, a sputtering method and a CVD method.

In the plane-type field emission device, preferably, the electron-emitting portion is made of a material having a smaller work function $\Phi$ than a material for constituting a cathode electrode. The material for constituting an electron-emitting portion can be selected on the basis of the work function of a material for constituting a cathode electrode, a potential difference between the gate electrode and the cathode electrode, a required current density of emitted electrons, and the like. Typical examples of the material for constituting a cathode electrode of the field emission device include tungsten ($\Phi$=4.55 eV), niobium ($\Phi$=4.02–4.87 eV), molybdenum ($\Phi$=4.53–4.95 eV), aluminum ($\Phi$=4.28 eV), copper ($\Phi$=4.6 eV), tantalum ($\Phi$=4.3 eV), chromium ($\Phi$=4.5 eV) and silicon ($\Phi$=4.9 eV). The material for constituting an electron-emitting portion preferably has a smaller work function $\Phi$ than these materials, and the value of the work function thereof is preferably approximately 3 eV or smaller. Examples of such a material include carbon ($\Phi$<1 eV), cesium ($\Phi$=2.14 eV), $LaB_6$ ($\Phi$=2.66–2.76 eV), BaO ($\Phi$=1.6–2.7 eV), SrO ($\Phi$=1.25–1.6 eV), $Y_2O_3$ ($\Phi$=2.0 eV), CaO ($\Phi$=1.6–1.86 eV), BaS ($\Phi$=2.05 eV), TiN ($\Phi$=2.92 eV) and ZrN ($\Phi$=2.92 eV). More preferably, the electron-emitting portion is made of a material having a work function $\Phi$ of 2 eV or smaller. The material for constituting an electron-emitting portion is not necessarily required to have electric conductivity.

Otherwise, in the plane-type field emission device, the material for constituting an electron-emitting portion can be selected from materials having a secondary electron gain $\delta$ greater than the secondary electron gain $\delta$ of the electrically conductive material for constituting a cathode electrode. That is, the above material can be properly selected from metals such as silver (Ag), aluminum (Al), gold (Au), cobalt (Co), copper (Cu), molybdenum (Mo), niobium (Nb), nickel (Ni), platinum (Pt), tantalum (Ta), tungsten (W) and zirconium (Zr); semiconductors such as silicon (Si) and germanium (Ge); inorganic simple substances such as carbon and diamond; and compounds such as aluminum oxide ($Al_2O_3$), barium oxide (BaO), beryllium oxide (BeO), calcium oxide (CaO), magnesium oxide (MgO), tin oxide ($SnO_2$), barium fluoride ($BaF_2$) and calcium fluoride ($CaF_2$). The material for constituting an electron-emitting portion is not necessarily required to have electric conductivity.

In the plane-type field emission device, as a material for constituting an electron-emitting portion, particularly, carbon is preferred. More specifically, diamond, graphite and a carbon nano-tube structure are preferred. When the electron-emitting portion is made of diamond, graphite or a carbon nano-tube structure, an emitted-electron current density necessary for the display can be obtained at an electric field intensity of $5\times10^7$ V/m or lower. Further, since diamond is an electric resister, emitted-electron currents obtained from the electron-emitting portions can be brought into uniform currents, and the fluctuation of luminescence efficiency can be suppressed when such field emission devices are incorporated into the display. Further, since the above materials exhibit remarkably high durability against sputtering by ions of residual gas in the display, field emission devices having a longer lifetime can be attained.

Specifically, the carbon nano-tube structure includes a carbon nano-tube and a carbon nano-fiber. More specifically, the electron-emitting portion may be constituted of a carbon nano-tube, it may be constituted of a carbon nano-fiber, or it may be constituted of a mixture of a carbon nano-tube with a carbon nano-fiber. Macroscopically, the carbon nano-tube and carbon nano-fiber may have the form of a powder or a thin film. The carbon nano-tube structure may have the form of a cone in some cases. The carbon nano-tube and carbon nano-fiber can be produced or formed by a known PVD method as an arc discharge method and a laser abrasion method; and any one of various CVD methods such as a plasma CVD method, a laser CVD method, a thermal CVD method, a gaseous phase synthetic method and a gaseous phase growth method.

The plane-type field emission device can be produced by a method in which a dispersion of a carbon nano-tube structure in a binder material is, for example, applied onto a desired region of the cathode electrode and the binder material is fired or cured (more specifically, a method in which the carbon nano-tube structure is dispersed in an organic binder material such as an epoxy resin or an acrylic resin or an inorganic binder material such as water glass, the dispersion is, for example, applied onto a desired region of the cathode electrode, then, the solvent is removed and the binder material is fired and cured). The above method will be referred to as "first forming method of a carbon nano-tube structure". The application method includes, for example, a screen printing method.

Alternatively, the plane-type field emission device can be produced by a method in which a dispersion of the carbon nano-tube structure in a metal compound solution is applied onto the cathode electrode and then, the metal compound is fired, whereby the carbon nano-tube structure is fixed to the surface of the cathode electrode with a matrix containing metal atoms constituting the metal compound. The above method will be referred to as "second forming method of a carbon nano-tube structure". The matrix is preferably constituted of an electrically conductive metal oxide. More specifically, it is preferably constituted of tin oxide, indium oxide, indium-tin oxide, zinc oxide, antimony oxide or antimony-tin oxide. After the firing, there can be obtained a state where part of each nano-tube structure is embedded in the matrix, or there can be obtained a state where the entire portion of each carbon nano-tube is embedded in the matrix. The matrix preferably has a volume resistivity of $1\times10^{-9}$ $\Omega\cdot m$ to $5\times10^{-6}$ $\Omega\cdot m$.

The metal compound for constituting the metal compound solution includes, for example, an organometal compound, an organic acid metal compound and metal salts (for example, chloride, nitrate and acetate). The organic acid metal compound solution is, for example, a solution prepared by dissolving an organic tin compound, an organic indium compound, an organic zinc compound or an organic antimony compound in an acid (for example, hydrochloric acid, nitric acid or sulfuric acid) and diluting the resultant solution with an organic solvent (for example, toluene, butyl acetate or isopropyl alcohol). Further, the organic metal compound solution is, for example, a solution prepared by dissolving an organic tin compound, an organic indium compound, an organic zinc compound or an organic antimony compound in an organic solvent (for example, toluene, butyl acetate or isopropyl alcohol). When the amount of the solution is 100 parts by weight, the solution preferably has a composition containing 0.001 to 20 parts by weight of the carbon nano-tube structure and 0.1 to 10 parts by weight of the metal compound. The solution may contain a dispersing agent and a surfactant. From the viewpoint of increasing the thickness of the matrix, an additive such as carbon black or the like may be added to the metal compound solution. In some cases, the organic solvent may be replaced with water.

The method for applying, onto the cathode, electrode the metal compound solution in which the carbon nano-tube structure is dispersed includes a spray method, a spin coating method, a dipping method, a die quarter method and a screen printing method. Of these, a spray method is preferred in view of easiness in application.

There may be employed a constitution in which the metal compound solution in which the carbon nano-tube structure is disperse is applied onto the cathode electrode, the metal compound solution is dried to form a metal compound layer, then, an unnecessary portion of the metal compound layer on the cathode electrode is removed, and then the metal compound is fired. Otherwise, an unnecessary portion of the metal compound layer on the cathode electrode may be removed after the metal compound is fired. Otherwise, the metal compound solution may be applied only onto a desired region of the cathode electrode.

The temperature for firing the metal compound is preferably, for example, a temperature at which the metal salt is oxidized to form a metal oxide having electric conductivity, or a temperature at which the organometal compound or an organic acid metal compound is decomposed to form a matrix (for example, a metal oxide having electric conductivity) containing metal atoms constituting the organometal compound or the organic acid metal compound. For example, the above temperature is preferably at least 300° C. The upper limit of the firing temperature can be a temperature at which elements constituting the field emission device or the cathode panel do not suffer any thermal damage and the like.

In the first forming method or the second forming method of a carbon nano-tube structure, it is preferred to carry out a kind of an activation treatment (washing treatment) of the surface of the electron-emitting portion, since the efficiency of emission of electrons from the electron-emitting portion is further improved. The above activation treatment includes a plasma treatment in an atmosphere containing a gas such as hydrogen gas, ammonia gas, helium gas, argon gas, neon gas, methane gas, ethylene gas, acetylene gas or nitrogen gas.

In the first forming method or the second forming method of a carbon nano-tube structure, the electron-emitting portion may be formed in that portion of the cathode electrode which is positioned in a bottom portion of the second opening portion, or the electron-emitting portion may be also formed so as to extend from that portion of the cathode electrode which is positioned in a bottom portion of the second opening portion to a surface of that portion of the cathode electrode which is different from the cathode electrode portion in the bottom portion of the second opening portion. Further, the electron-emitting portion may be formed on the entire surface or part of the surface of that portion of the cathode electrode that is positioned in the bottom portion of the second opening portion.

In the various field emission device, the material for constituting a cathode electrode can be selected from metals such as tungsten (W), niobium (Nb), tantalum (Ta), titanium (Ti), molybdenum (Mo), chromium (Cr), aluminum (Al) and copper (Cu), gold (Au), silver (Ag) and the like; alloys and compounds containing these metal elements (for example, nitrides such as TiN and silicides such as $WSi_2$, $MoSi_2$, $TiSi_2$ and $TaSi_2$); semiconductors such as silicon (Si); carbon thin film such as diamond; and indium-tin oxide (ITO). Although not specially limited, the thickness of the cathode electrode is approximately 0.05 to 0.5 $\mu$m, preferably 0.1 to 0.3 $\mu$m.

In the various field emission device, the material for constituting the gate electrode includes at least one metal selected from the group consisting of tungsten (W), niobium (Nb), tantalum (Ta), titanium (Ti), molybdenum (Mo), chromium (Cr), aluminum (Al), copper (Cu), gold (Au), silver (Ag), nickel (Ni), cobalt (Co), zirconium (Zr), iron (Fe), platinum (Pt) and zinc (Zn); alloys or compounds containing these metal elements (for example, nitrides such as TiN and silicides such as $WSi_2$, $MoSi_2$, $TiSi_2$ and $TaSi_2$); semiconductors such as silicon (Si); and electrically conductive metal oxides such as indium-tin oxide (ITO), indium oxide and zinc oxide.

The method for forming the cathode electrode and the gate electrode includes deposition methods such as an electron beam deposition method and a hot filament deposition method, a sputtering method, a combination of a CVD method or an ion plating method with an etching method, a screen-printing method, a plating method and a lift-off method. When a screen-printing method or a plating method is employed, the cathode electrodes in the form of stripes can be directly formed.

In the field emission device having the first or second structure, depending upon the structure of field emission device, one electron-emitting portion may exist in one first opening portion formed in the gate electrode and one second opening portion formed in the insulating layer, or a plurality of electron-emitting portions may exist in one first opening portion formed in the gate electrode and one second opening portion formed in the insulating layer, or one electron-emitting portion or a plurality of electron-emitting portions may exist in a plurality of first opening portions formed in the gate electrode and one second opening portion which is formed in the insulating layer and communicates with such first opening portions.

The plan form of the first or second opening portion (form obtained by cutting the first or second opening portion with an imaginary plane in parallel with the substrate surface) may be any form such as a circle, an oval, a rectangle, a polygon, a rounded rectangle or a rounded polygon. The first opening portion can be formed, for example, by isotropic etching or by a combination of anisotropic etching and isotropic etching. The first opening portion can be directly formed depending upon the forming method of the gate electrode. The second opening portion can also be formed, for example, by isotropic etching or by a combination of anisotropic etching and isotropic etching.

In the field emission device having the first structure, a resistance layer may be formed between the cathode electrode and the electron-emitting portion. Otherwise, when the surface of the cathode electrode corresponds to the electron-emitting portion, that is, in the field emission device having the second structure, the cathode electrode may have a three-layered structure constituted of an electrically conductive material layer, a resistance layer and an electron-emitting layer corresponding to the electron-emitting portion. The resistance layer can stabilize performances of the field emission device and can attain uniform electron-emitting properties. The material for constituting a resistance layer includes carbon-containing materials such as silicon carbide (SiC) and SiCN; SiN; semiconductor materials such as amorphous silicon and the like; and refractory metal oxides such as ruthenium oxide ($RuO_2$), tantalum oxide and tantalum nitride. The resistance layer can be formed by a sputtering method, a CVD method or a screen-printing method. The resistance value of the resistance layer is approximately $1\times10^5$ to $1\times10^7$ Ω, preferably several MΩ.

As a material for constituting an insulating layer, $SiO_2$-containing material such as $SiO_2$, BPSG, PSG, BSG, AsSG, PbSG, SiN, SiON and spin on glass (SOG), low melting-point glass and a glass paste, SiN, an insulating resin such as polyimide and the like can be used alone or in combination. The insulating layer can be formed by a known method such as a CVD method, an application method, a sputtering method or a screen printing method.

Spindt-Type Field Emission Device

The structure of the Spindt-type field emission device and the production method thereof have been explained in Example 1.

Plane-Type Field Emission Device (No. 1)

The plane-type field emission device comprises;

(A) a cathode electrode 12 which is formed on the substrate 11 and extends in a first direction, (B) an insulating layer 13 formed on the substrate 11 and the cathode electrode 12, (C) a gate electrode 14 which is formed on the insulating layer 13 and extends in a second direction different from the first direction, (D) a first opening portion 15A formed in the gate electrode 14 and a second opening portion 15B formed in the insulating layer 13 and communicating with the first opening portion 15A, and (E) a plane electron-emitting portion 16A formed on the cathode electrode 12 positioned in the bottom portion of the second opening portion 15B, and the plane-type field emission device has a structure in which the electron-emitting portion 16A exposed in the bottom portion of the second opening portion 15B is for emitting electrons.

The electron-emitting portion 16A comprises a matrix 50 and a carbon nano-tube structure (specifically, carbon nano-tubes 51) that is embedded in the matrix 50 in a state where the top portion of the carbon nano-tube structure is projected. The matrix 50 is constituted of an electrically conductive metal oxide (specifically, indium-tin oxide, ITO).

The production method of the field emission device will be explained with reference to FIGS. 10A and 10B and FIGS. 11A and 11B hereinafter.

Step-200

First, stripe-shaped cathode electrode 12 made of an approximately 0.2 μm thick chromium (Cr) layer is formed on a substrate 11 made, for example, of a glass substrate, for example, by a sputtering method and an etching technique.

Step-210

Then, a metal compound solution consisting of an organic acid metal compound solution in which the carbon nano-tube structure is dispersed is applied onto the cathode electrode 12, for example, by a spray method. Specifically, a metal compound solution shown in Table 2 is used. In the metal compound solution, the organic tin compound and the organic indium compound are in a state where they are dissolved in an acid (for example, hydrochloric acid, nitric acid or sulfuric acid). The carbon nano-tube is produced by an arc discharge method and has an average diameter of 30 nm and an average length of 1 μm. In the application, the substrate is heated to 70–150° C. Atmospheric atmosphere is employed as an application atmosphere. After the application, the substrate is heated for 5 to 30 minutes to fully evaporate butyl acetate off. When the substrate is heated during the application as described above, the applied solution begins to dry before the carbon nano-tube is self-leveled toward a horizontal direction of the surface of the cathode electrode. As a result, the carbon nano-tube can be arranged on the surface of the cathode electrode in a state where the carbon nano-tube is not in a level position. That is, the carbon nano-tube can be aligned in the direction in which the top portion of the carbon nano-tube faces the anode electrode, in other words, the carbon nano-tube comes close to the normal direction of the substrate. The metal compound solution having a composition shown in Table 2 may be prepared beforehand, or a metal compound solution containing no carbon nano-tube may be prepared beforehand and the carbon nano-tube and the metal compound solution may be mixed before the application. For improving dispersibility of the carbon nano-tube, ultrasonic wave may be applied when the metal compound solution is prepared.

TABLE 2

| | |
|---|---|
| Organic tin compound and organic indium compound | 0.1–10 parts by weight |
| Dispersing agent (sodium dodecylsulfate) | 0.1–5 parts by weight |
| Carbon nano-tube | 0.1–20 parts by weight |
| Butyl acetate | Balance |

When a solution of an organic tin compound dissolved in an acid is used as an organic acid metal compound solution, tin oxide is obtained as a matrix. When a solution of an organic indium compound dissolved in an acid is used, indium oxide is obtained as a matrix. When a solution of an organic zinc compound dissolved in an acid is used, zinc oxide is obtained as a matrix. When a solution of an organic antimony compound dissolved in an acid is used, antimony oxide is obtained as a matrix. When a solution of an organic antimony compound and an organic tin compound dissolved in an acid is used, antimony-tin oxide is obtained as a matrix. Further, when an organic tin compound is used as an organic metal compound solution, tin oxide is obtained as a matrix. When an organic indium compound is used, indium oxide is obtained as a matrix. When an organic zinc compound is used, zinc oxide is obtained as a matrix. When an organic antimony compound is used, antimony oxide is obtained as a matrix. When an organic antimony compound and an organic tin compound are used, antimony-tin oxide is obtained as a matrix. Alternatively, a solution of metal chloride (for example, tin chloride or indium chloride) may be used.

After the metal compound solution is dried, salient convexo-concave shapes may be formed on the surface of the metal compound layer in some cases. In such cases, it is desirable to apply the metal compound solution again on the metal compound layer without heating the substrate.

Step-220

Then, the metal compound constituted of the organic acid metal compound is fired, to give an electron-emitting portion 16A having the carbon nano-tubes 51 fixed onto the surface of the cathode electrode 12 with a matrix 50 (which is specifically a metal oxide, and more specifically, ITO) containing metal atoms (specifically, In and Sn) constituting the organic acid metal compound. The firing is carried out in an atmospheric atmosphere at 350° C. for 20 minutes. The thus-obtained matrix 50 had a volume resistivity of $5 \times 10^{-7}$ $\Omega \cdot m$. When the organic acid metal compound is used as a starting material, the matrix 50 made of ITO can be formed at a low firing temperature of as low as 350° C. The organic acid metal compound solution may be replaced with an organic metal compound solution. When a solution of metal chloride (for example, tin chloride and indium chloride) is used, the matrix 50 made of ITO is formed while the tin chloride and indium chloride are oxidized by the firing.

Step-230

Then, a resist layer is formed on the entire surface, and the circular resist layer having a diameter, for example, of 10 µm is retained above a desired region of the cathode electrode 12. The matrix 50 is etched with hydrochloric acid having a temperature of 10 to 60° C. for 1 to 30 minutes, to remove an unnecessary portion of the electron-emitting portion. Further, when the carbon nano-tubes still remain in a region different from the desired region, the carbon nano-tubes are etched by an oxygen plasma etching treatment under a condition shown in Table 3. A bias power may be 0 W, i.e., direct current, while it is desirable to apply the bias power. The substrate may be heated, for example, to approximately 80° C.

TABLE 3

| Apparatus to be used | RIE apparatus |
| --- | --- |
| Gas to be introduced | Gas containing oxygen |
| Plasma exciting power | 500 W |
| Bias power | 0–150 W |
| Treatment time period | at least 10 seconds |

Alternatively, the carbon nano-tubes can be etched by a wet etching treatment under a condition shown in Table 4.

TABLE 4

| Solution to be used | KMnO$_4$ |
| --- | --- |
| Temperature | 20–120° C. |
| Treatment time period | 10 seconds–20 minutes |

Figure 10A:
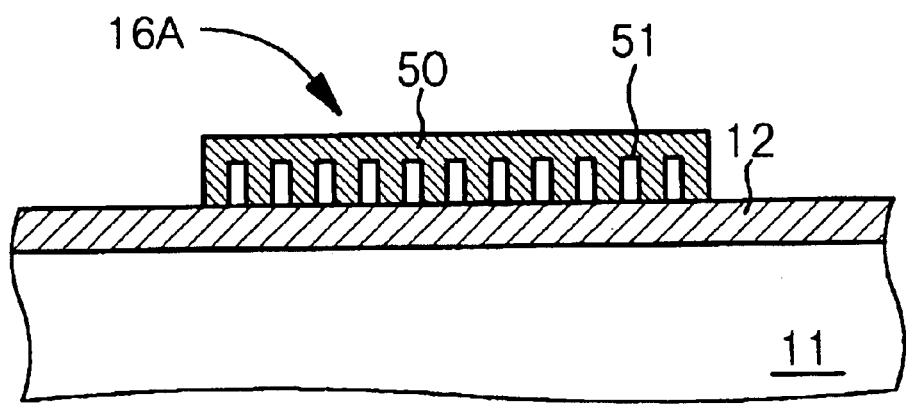
FIGS. 10A and 10B are schematic partial cross-sectional views of a substrate, etc., for explaining a production method of a plane-type cold cathode field emission device (No. 1).
Figure 10B:
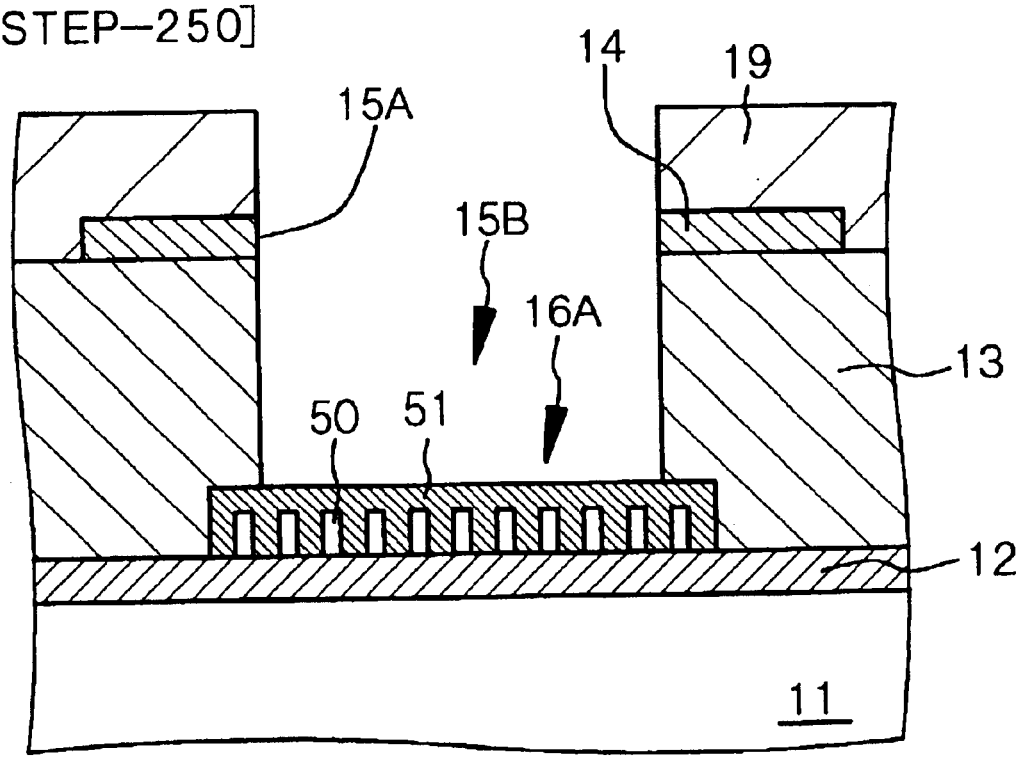

Then, the resist layer is removed, whereby a structure shown in FIG. 10A can be obtained. It is not necessarily required to retain a circular electron-emitting portion having a diameter of 10 µm. For example, the electron-emitting portion may be retained on the cathode electrode 12.

The process may be carried out in the order of [Step-210], [Step-230] and [Step-220].

Step-240

An insulating layer 13 is formed on the electron-emitting portion 16A, the substrate 11 and the cathode electrode 12. Specifically, an approximately 1 µm thick insulating layer 13 is formed on the entire surface by a CVD method using, for example, tetraethoxysilane (TEOS) as a source gas.

Step-250

Then, a stripe-shaped gate electrode 14 is formed on the insulating layer 13, and further, a mask layer 19 is formed on the insulating layer 13 and the gate electrode 14. Then, a first opening portion 15A is formed through the gate electrode 14, and further, a second opening portion 15B communicating with the first opening portion 15A formed through the gate electrode 14 is formed through the insulating layer 13 (see FIG. 10B). When the matrix 50 is constituted of a metal oxide, for example, ITO, the insulating layer 13 can be etched without etching the matrix 50. That is, the etching selection ratio between the insulating layer 13 and the matrix 50 is approximately infinite. The carbon nano-tubes 51 are therefore not damaged when the insulating layer 13 is etched.

Step-260

Then, preferably, part of the matrix 50 is removed under a condition shown in Table 5, to obtain the carbon nano-tubes 51 in a state where top portions thereof are projected from the matrix 50. In this manner, the electron-emitting portion 16A having a structure shown in FIG. 11A can be obtained.

TABLE 5

| Etching solution | Hydrochloric acid |
| --- | --- |
| Etching time period | 10 seconds–30 seconds |
| Etching temperature | 10–60° C. |

Some or all of the carbon nano-tubes 51 may change in their surface state due to the etching of the matrix 50 (for example, oxygen atoms or oxygen molecules or fluorine atoms are adsorbed to their surfaces), and the carbon nano-tubes 51 are deactivated with respect of electric field emission in some cases. Therefore, it is preferred to subject the electron-emitting portion 16A to a plasma treatment in a hydrogen gas atmosphere. By the plasma treatment, the electron-emitting portion 16A is activated, and the efficiency of emission of electrons from the electron-emitting portion 16A is further improved. Table 6 shows an example of a plasma treatment condition.

TABLE 6

| Gas to be used | H$_2$ = 100 sccm |
| --- | --- |
| Source power | 1000 W |
| Power to be applied to substrate | 50 V |
| Reaction pressure | 0.1 Pa |
| Substrate temperature | 300° C. |

Then, for releasing gas from the carbon nano-tubes 51, a heating treatment or various plasma treatments may be carried out. For allowing a substance to be adsorbed to the surfaces of the carbon nano-tubes 51, the carbon nano-tubes 51 may be exposed to a gas containing the substance whose adsorption is desirable. For purifying the carbon nano-tubes 51, an oxygen plasma treatment or a fluorine plasma treatment may be carried out.

Step-270

Figure 11A:
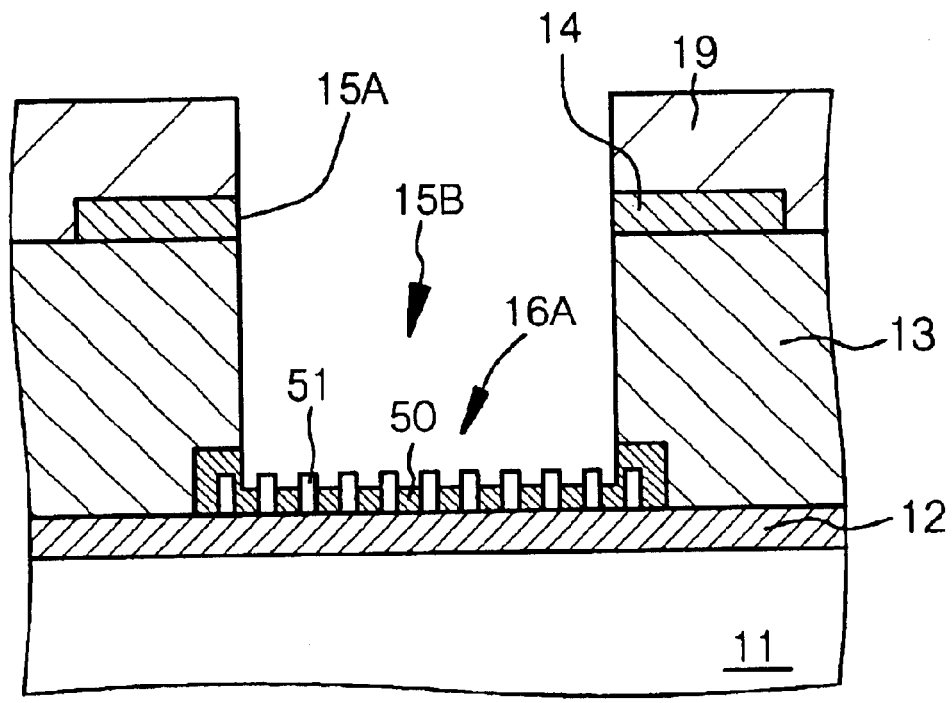
FIGS. 11A and 11B, following
Figure 11B:
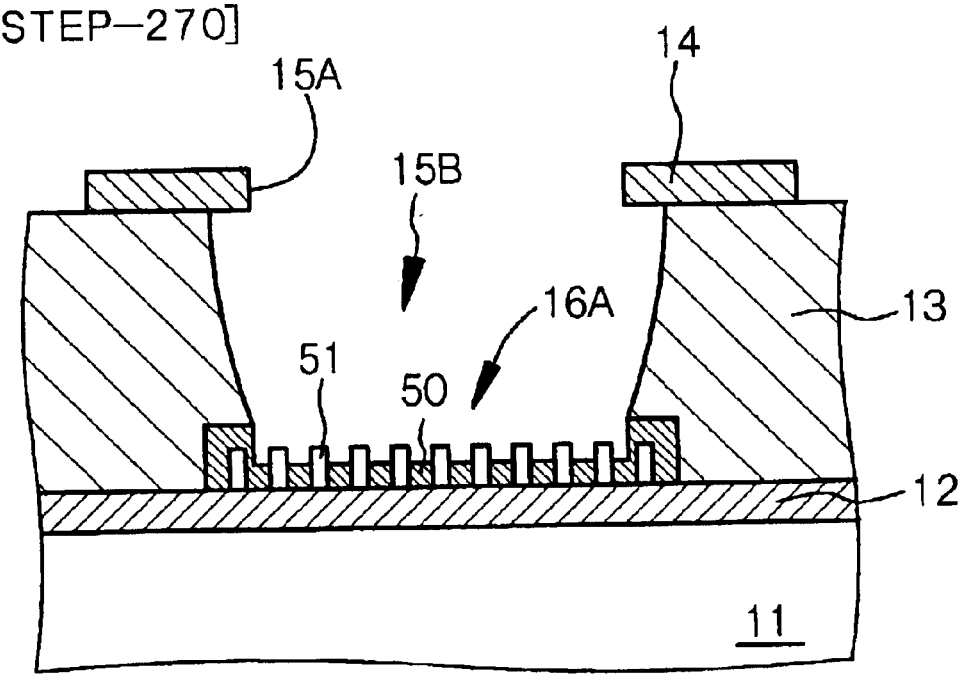

Then, the side wall surface of the second opening portion 15B formed through the insulating layer 13 is allowed to recede by isotropic etching, which is preferred from the viewpoint of exposing the opening end portion of the gate electrode 14. The isotropic etching can be carried out by dry etching using radicals as main etching species like chemical dry etching, or by wet etching using an etching solution. As an etching solution, for example, a mixture containing a 49% hydrofluoric acid aqueous solution and pure water in a hydrofluoric acid aqueous solution:pure water volume ratio of 1:100 can be used. Then, the mask layer 19 is removed, whereby a field emission device shown in FIG. 11B is completed.

The above process can be carried out in the order of [Step-250], [Step-270] and [Step-260].

Flat-Type Field Emission Device (No. 2)

Figure 12A:
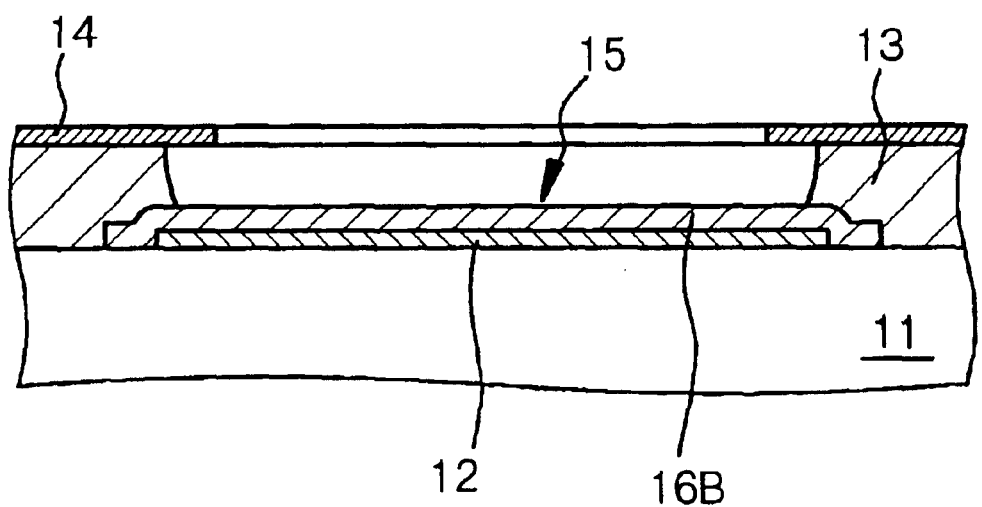
FIGS. 12A and 12B are a schematic partial cross-sectional view of a plane-type cold cathode field emission device (No. 2) and a schematic partial cross-sectional view of a flat-type cold cathode field emission device.

FIG. 12A shows a schematic partial cross-sectional view of a flat-type field emission device. The flat-type field emission device comprises a cathode electrode 12 formed on a substrate 11 made, for example, of glass; an insulating layer 13 formed on the substrate 11 and the cathode electrode 12; a gate electrode 14 formed on the insulating layer 13; an opening portion 15 penetrating through the gate electrode 14 and the insulating layer 13 (a first opening portion formed in the gate electrode and a second opening portion formed in the insulating layer and communicating with the first opening portion); and a flat electron-emitting portion (electron-emitting layer 16B) formed on a portion of the cathode electrode 12 which portion is positioned in a bottom portion of the opening portion 15. The electron-emitting layer 16B is formed on the stripe-shaped cathode electrode 12 extending in the direction perpendicular to the paper surface of the drawing. The gate electrode 14 extends leftward and rightward on the paper surface of the drawing. The cathode electrode 12 and the gate electrode 14 are made of chromium. Specifically, the electron-emitting layer 16B is constituted of a thin layer made of graphite powders. The electron-emitting layer 16B is specifically made of graphite powders. In the flat-type field emission device shown in FIG. 12A, the electron-emitting layer 16B is formed on the entire surface of the cathode electrode 12. However, the electron-emitting layer shall not be limited to the above structure, and the electron-emitting layer 16B may be formed at least in the bottom portion of the opening portion 15.

Plane-Type Field Emission Device

Figure 12B:
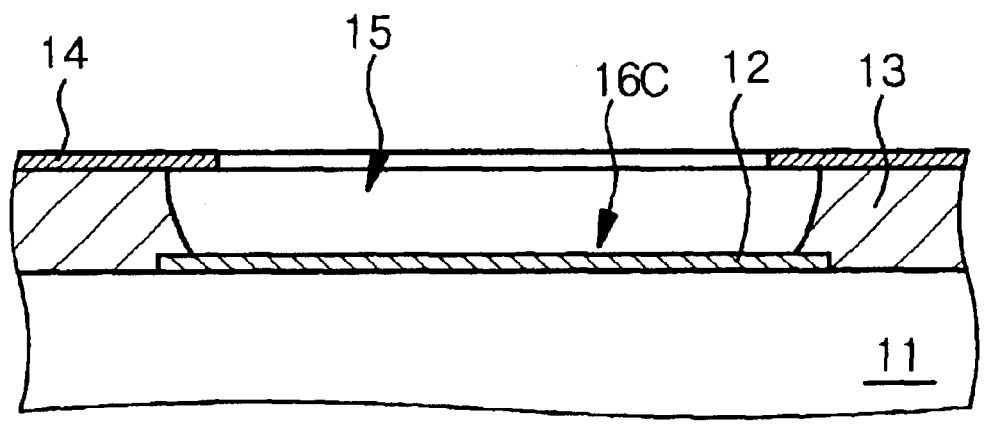

FIG. 12B shows a schematic partial cross-sectional view of a plane-type field emission device. The plane-type field emission device comprises a stripe-shaped cathode electrode 12 formed on a substrate 11 made, for example, of glass; an insulating layer 13 formed on the substrate 11 and the cathode electrode 12; a stripe-shaped gate electrode 14 formed on the insulating layer 13; and an opening portion 15 penetrating through the gate electrode 14 and the insulating layer 13 (a first opening portion and a second opening portion). The cathode electrode 12 is exposed in a bottom portion of the opening portion 15. The cathode electrode 12 extends in the direction perpendicular to the paper surface of the drawing, and the gate electrode 14 extends leftward and rightward on the paper surface of the drawing. The cathode electrode 12 and the gate electrode 14 are made of chromium (Cr), and the insulating layer 13 is made of $SiO_2$. A portion of the cathode electrode 12 which portion is exposed in the bottom portion of the opening portion 15 corresponds to an electron-emitting portion 16C.

Cathode Ray Tube

Figure 13:
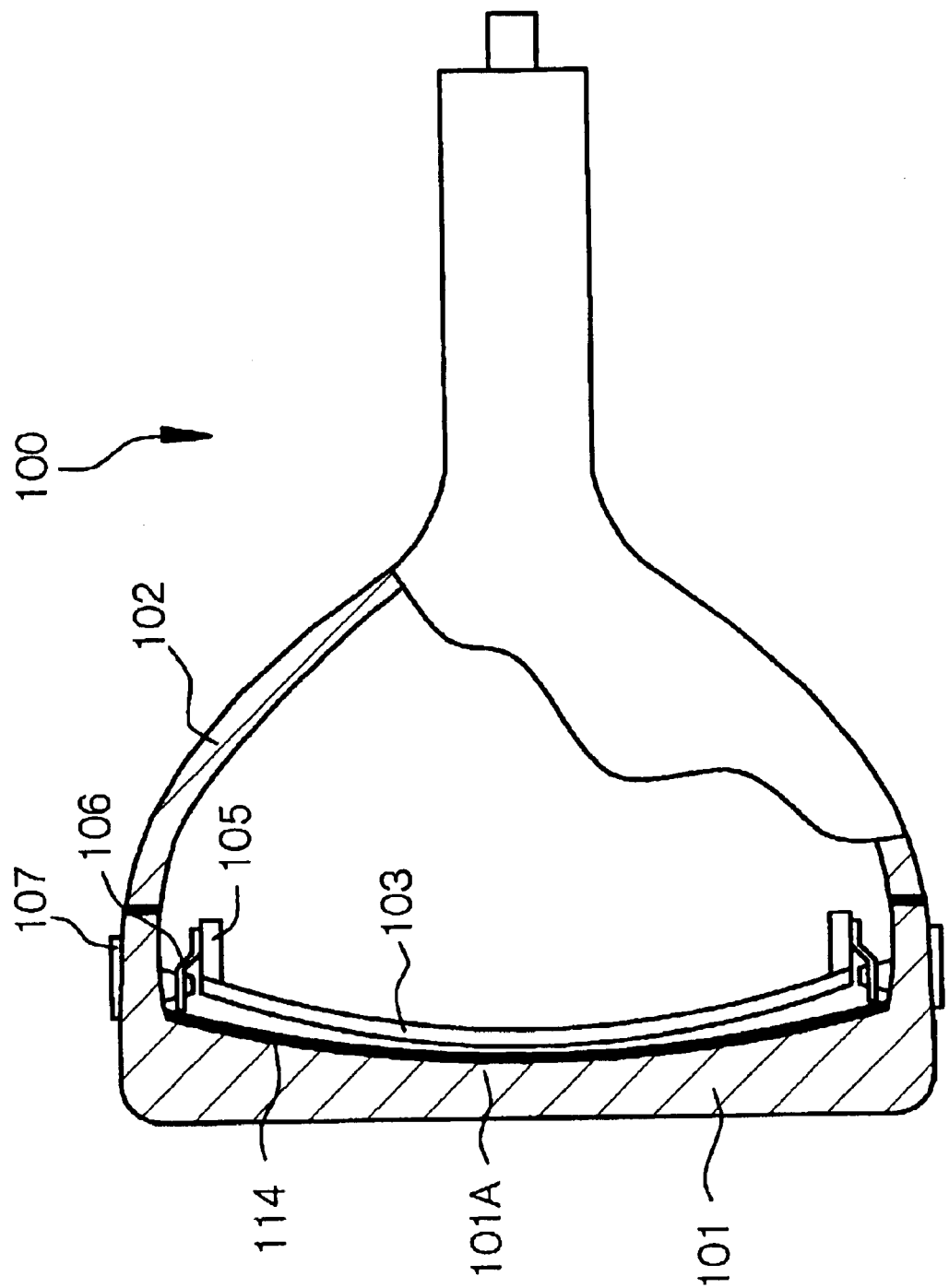
FIG. 13 is a schematic drawing of a glass bulb for a color image-receiving tube that is partly cut off.
Figure 14:
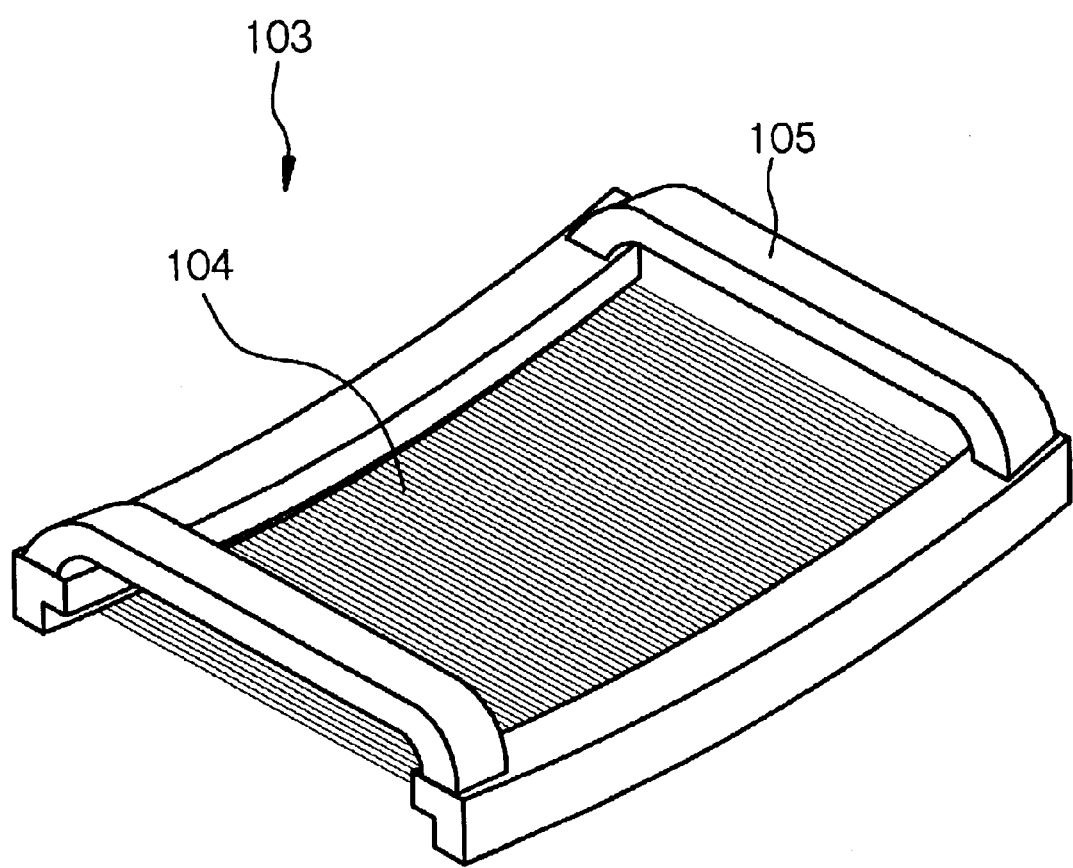
FIG. 14 is a schematic perspective view of an aperture grille type color selection mechanism.

An example to which the phosphor powders of the present invention are applied to a cathode ray tube is explained hereinafter. A face plate of the cathode ray tube corresponds to a display panel. FIG. 13 shows a schematic partial cut-off view of a color television glass bulb. As shown in FIG. 13, a face plate 100 is formed by bonding a glass panel 101 and a funnel 102 with a glass adhesive. A tension band 107 is wound around the glass panel 101 near the funnel 102, to increase the strength of the color television glass bulb. As shown in the schematic perspective view of FIG. 14, a color selection mechanism 103 has slits 104. The aperture grille type color selection mechanism 103 is attached to a frame member 105 by a resistance welding method or a laser welding method in a state where a tension is applied thereto in the extending direction of the slits 104. The frame member 105 is removably attached to the glass panel 101 with an attaching tool 106 made of a spring. Luminescent layers 114 are formed on an inner surface 101A of the glass panel 101. The luminescent layers 114 are constituted of the phosphor powders manufactured by the same method as that explained in Example 1, 2 or 3. A metal back layer is formed on the luminescent layers 114. However, showing of the metal back layer is omitted.

Figure 15A:
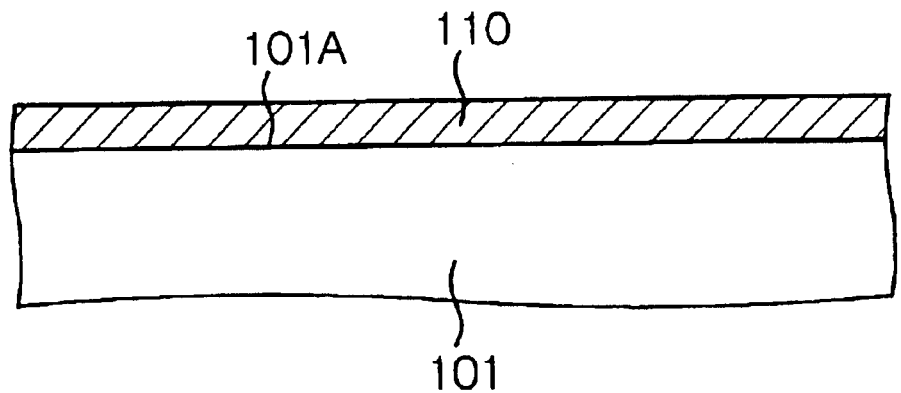
FIGS. 15A to 15C are schematic partial end views of a face plate, etc., for explaining a production method of a glass bulb for a color image-receiving tube.
Figure 15B:
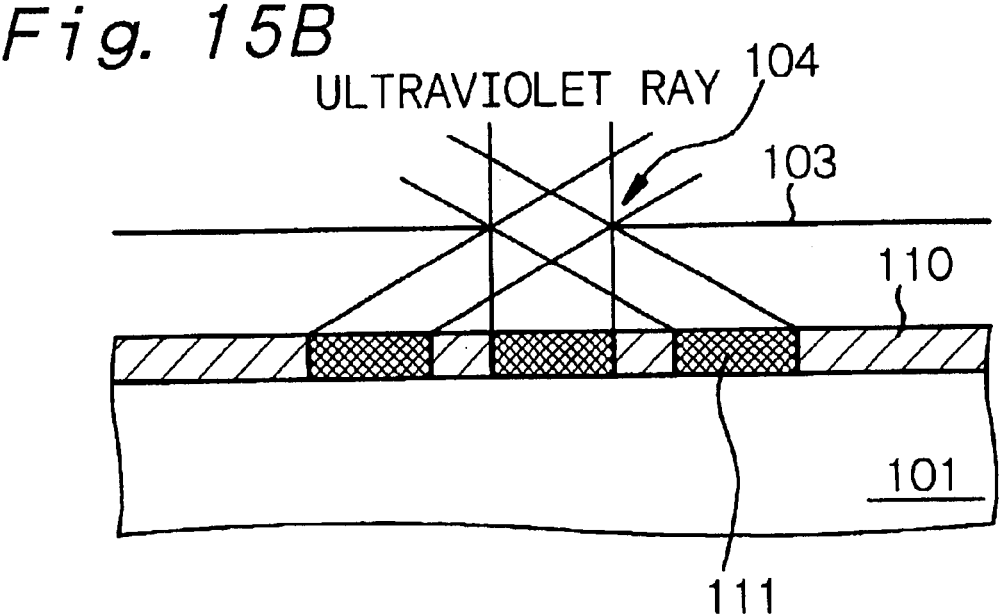
Figure 15C:
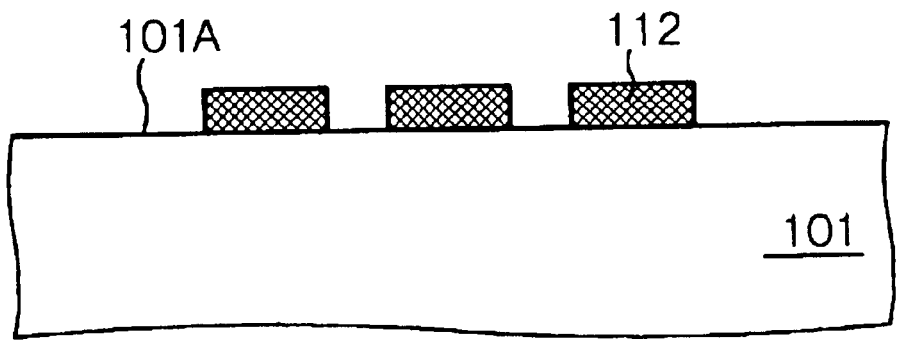
Figure 16A:
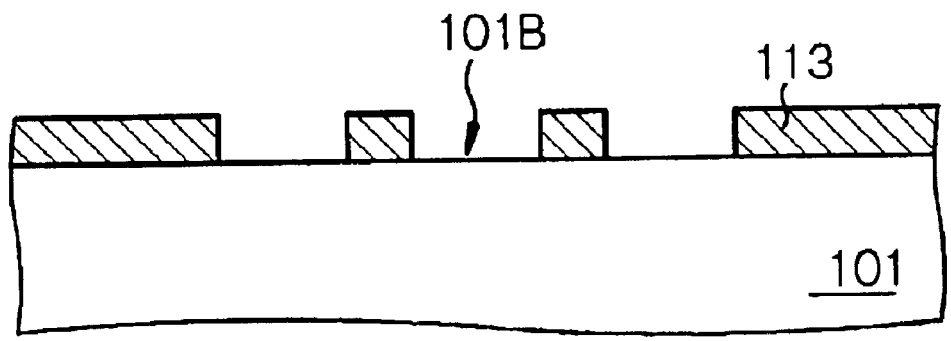
FIGS. 16A and 16B, following
Figure 16B:
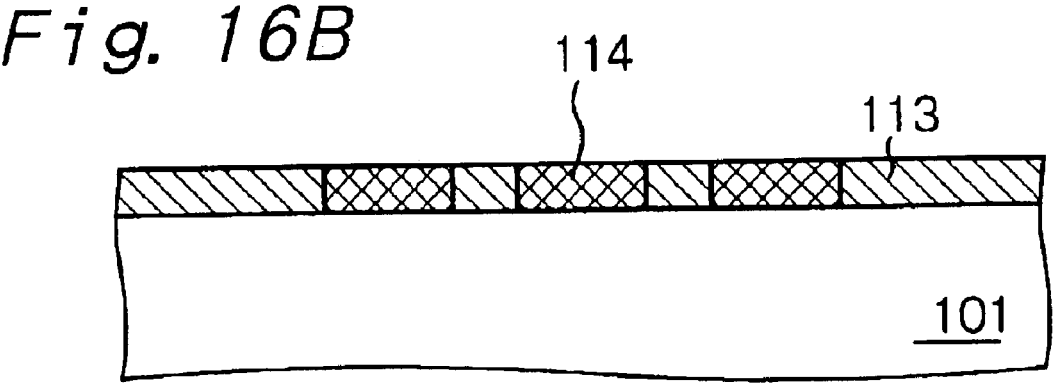

The method for producing the face plate, particularly, the method for forming the luminescent layers 114, will be explained with reference to FIGS. 15A, 15B, 15C, 16A and 16B showing schematic partial end views of the glass panel, etc. The stripe-shaped color luminescent layers are formed with the glass panel 101 provided with the aperture grille type color selection mechanism 103 having the stripe-shaped slits 104 extending in parallel with the perpendicular direction of the glass panel 101. The color selection mechanism 103 is shown in FIG. 15B alone.

First, a photosensitive coating 110 is applied to the inner surface 101A of the glass panel 101 and dried (see FIG. 15A), and then a stripe-shaped exposure region 111 is formed in the photosensitive coating 110 with an ultraviolet ray which is radiated from a light source (not shown) and passes through the stripe-shaped slit 104 formed in the color selection mechanism 103 (see FIG. 15B). The above exposure treatment is carried out three times by changing the light source in position for forming the luminescent layers for red, green and blue. Then, the photosensitive coating 110 is developed to selectively remove it, and a remaining portion of the photosensitive coating (exposed and developed photosensitive coating) 112 is retained on the inner surface 101A of the glass panel 101 (see FIG. 15C). Then, a carbon agent is applied to the entire surface, and the remaining photosensitive coating 112 and the carbon agent thereon are removed by a lift-off method, to form stripe-shaped black matrices 113 made of the carbon agent (see FIG. 16A). Then, the stripe-shaped luminescent layers 114 for red, green and blue are formed on the exposed inner surface of the glass panel 101 (exposed inner surface portion 101B between the black matrices 113 in the face plate 100) (see FIG. 16B). Specifically, phosphor powder compositions prepared from the phosphor powders (phosphor particles) manufactured by the same method as that explained in Example 1, 2 or 3 are used, and for example, a red photosensitive phosphor powder composition (phosphor slurry) can be applied to the entire surface, exposed to light and developed, then, a green photosensitive phosphor powder composition (phosphor slurry) can be applied to the entire surface, exposed to light and developed, and then a blue photosensitive phosphor powder composition (phosphor slurry) is applied to the entire surface, exposed to light and developed.

The color selection mechanism may be a dot type shadow mask type or a slot type shadow mask type color selection mechanism.

Plasma Display

Figure 17:
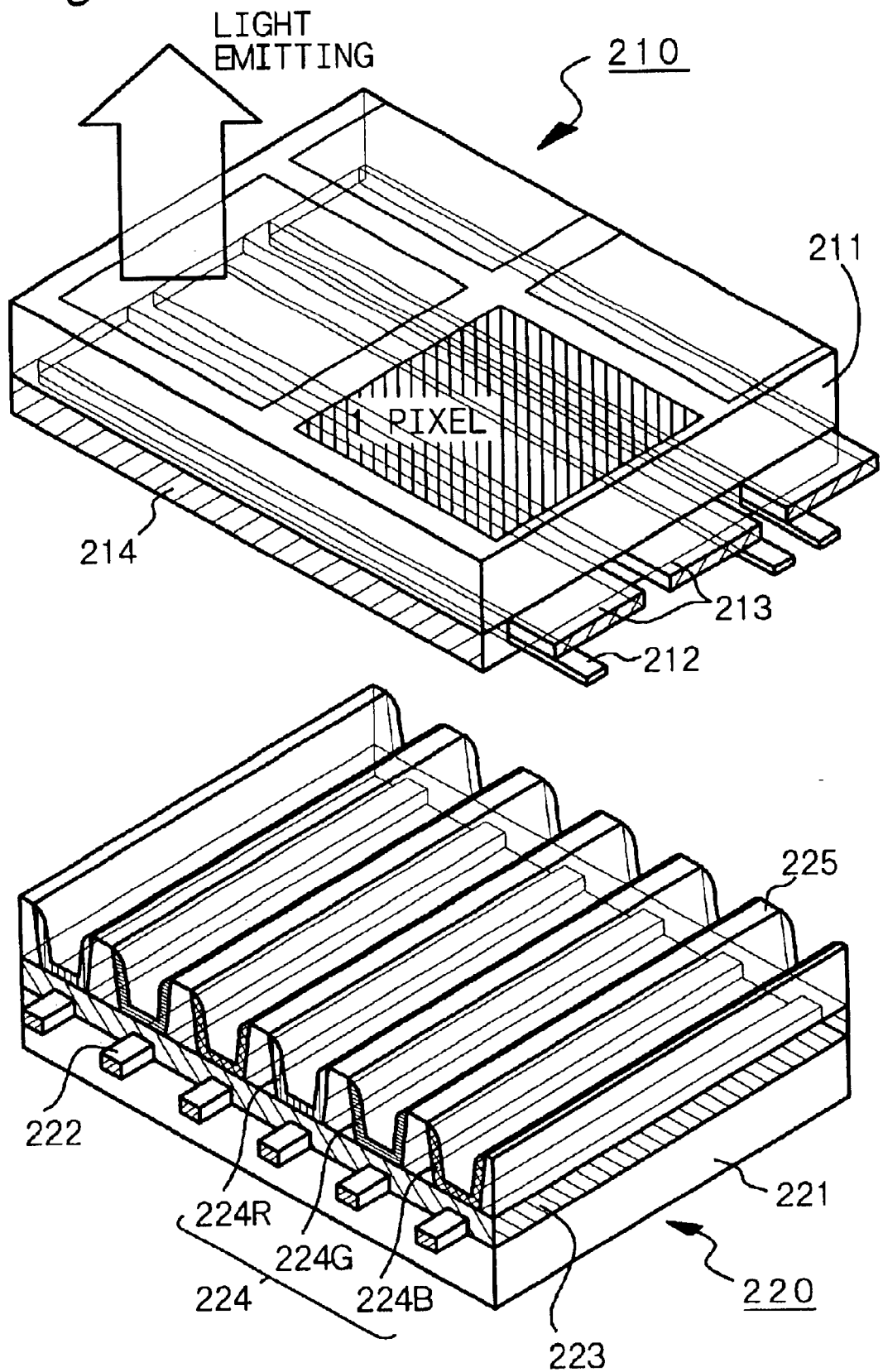
FIG. 17 is a conceptual exploded perspective view of a plasma display.

An example to which the phosphor powders of the present invention are applied to a plasma display (PDP) is explained hereinafter. FIG. 17 shows a typical constitution of an AC plasma display. This AC plasma display comes under a so-called three-electrodes-type, and discharge mainly takes place between a pair of discharge sustain electrodes 213. The AC plasma display shown in FIG. 17 is formed by bonding a front panel 210 and a rear panel 220 in their circumferential portions. Light emission of luminescent layers 224 on the rear panel 220 is observed through the front panel 210.

The front panel 210 comprises a transparent first substrate 211; pairs of discharge sustain electrodes 213 formed on the first substrate 211 in the form of stripes and made of a transparent electrically conductive material; bus electrodes 212 provided for decreasing the impedance of the discharge sustain electrodes 213 and made of a material having a lower electric resistance than the discharge sustain electrodes 213; and a protective layer 214 which is formed on the first substrate 211, the bus electrodes 212 and the discharge sustain electrodes 213 and which works as a dielectric film.

The rear panel 220 comprises a second substrate (support member) 221; address electrodes (also called data electrodes) 222 formed on the second substrate 221 in the form of stripes; a dielectric film 223 formed on the second substrate 221 and the address electrodes 222; insulating separation walls 225 each of which exists in a region on the dielectric film 223 and between one address electrode 222 and neighboring another address electrode 222 and extends in parallel with the address electrodes 222; and luminescent layers 224 each of which is formed on the dielectric film 223 and extends over side walls of the separation walls 225. The luminescent layers 224 are constituted of red luminescent layers 224R, green luminescent layers 224G and blue luminescent layers 224B, and the luminescent layers 224R, 224G and 224B for these colors are formed in a predetermined order. These luminescent layers 224R, 224G and 224B are made of the phosphor powders manufactured by the same method as that explained in Example 1, 2 or 3. The method for forming the luminescent layers includes a thick-film printing method in which phosphor powder compositions containing the phosphor powders (phosphor particles) manufactured by the same method as that explained in Example 1, 2 or 3 are used, a method in which the phosphor particles are sprayed, a method in which an adhesive material is attached, beforehand, to a site where the luminescent layers are to be formed and the phosphor particles are bonded, a method in which photosensitive phosphor paste is used and the luminescent layers are patterned by exposure and development, and a method in which the luminescent layers are formed on the entire surface and unnecessary portions are removed by a sand blasting method.

FIG. 17 shows an exploded perspective view, and in an actual embodiment, the top portion of each separation wall 225 on the rear panel side is in contact with the protective layer 214 on the front panel side. A region where a pair of the discharge sustain electrodes 213 and the address electrode 222 positioned between two separation walls 225 overlap corresponds to a discharge cell. A space surrounded by neighboring separation walls 225, the luminescent layer 224 and the protective layer 214 is charged with a rare gas.

The extending direction of the discharge sustain electrodes 213 and the extending direction of the address electrodes 222 make an angle of 90 degrees, and a region where a pair of the discharge sustain electrodes 213 and one set of the luminescent layers 224R, 224G and 224B for emitting light in three primary colors overlap corresponds to one pixel. Glow discharge takes place between a pair of the discharge sustain electrodes 213, so that the plasma display of this type is called "surface discharge type". In each discharge cell, the luminescent layer excited upon irradiation with a vacuum ultraviolet ray generated by glow discharge in the rare gas emits light in a color characteristic of the phosphor material. A vacuum ultraviolet ray having a wavelength dependent upon the type of the charged rare gas is generated. As a rare gas, He (wavelength of resonance line=58.4 nm), Ne (ditto=74.4 nm), Ar (ditto=107 nm), Kr (ditto=124 nm) and Xe (ditto=147 nm) can be used alone or as a mixture. However, a mixed gas is particularly useful since a decrease in the discharge start voltage based on a Penning effect can be expected. Examples of the above mixed gas includes Ne—Ar mixed gas, He—Xe mixed gas and Ne—Xe mixed gas. Of these rare gases, Xe having the longest resonance line wavelength is suitable since it also radiates intense vacuum ultraviolet ray having a wavelength of 172 nm.

The present invention has been explained on the basis of Examples hereinabove, while the present invention shall not be limited thereto. The structures and the constitutions of the flat-panel display deivce, the cathode ray tube, the plasma display, the cold cathode field emission display and the cold cathode field emission device, the composition of the phosphor powders and the method for preparation thereof are shown as examples and can be altered or modified as required. Further, the method of production of each of the flat-panel display device, the cold cathode field emission device and the cathode ray tube are also shown as examples and may be altered or modified as required.

Further, those various materials used in the production of the cold cathode field emission devices are also shown as examples and may be altered or modified as required. In the cold cathode field emission devices, the embodiment in which one electron-emitting portion is principally related to one opening portion has been explained. In some structures of the cold cathode field emission device, however, there may be employed a constitution in which a plurality of the electron-emitting portions are related to one opening portion or a constitution in which one electron-emitting portion is related to a plurality of the opening portions. Otherwise, there may be employed a constitution in which a plurality of first opening portions are formed in the gate electrode, one second opening portion formed in the insulating layer and communicating with such first opening portions, and one electron-emitting portion or a plurality of electron-emitting portions is or are provided. In some cases, an anode electrode may be formed on a support member and a luminescent layer in the form of a stripe or a dot may be formed on the anode electrode.

In the cold cathode field emission display, the gate electrode can be formed so as to have a form in which the effective field is covered with one sheet of an electrically conductive material (having an opening portion). In this case, a positive voltage is applied to the gate electrode. And, a switching element constituted, for example, of TFT is provided between the cathode electrode constituting a pixel and the cathode-electrode driving circuit, and the voltage application state to the electron-emitting portion constituting the pixel is controlled by the operation of the above switching element, to control the light emission state of the pixel.

In the cold cathode field emission display, alternatively, the cathode electrode can be formed so as to have a form in which the effective filed is covered with one sheet of an electrically conductive material layer. In this case, a voltage is applied to the cathode electrode. And, a switching element constituted, for example, of TFT is provided between the gate electrode constituting a pixel and the gate-electrode driving circuit, and the voltage application state to the electron-emitting portion constituting the pixel is controlled by the operation of the switching element, to control the light emission state of the pixel.

Figure 18:
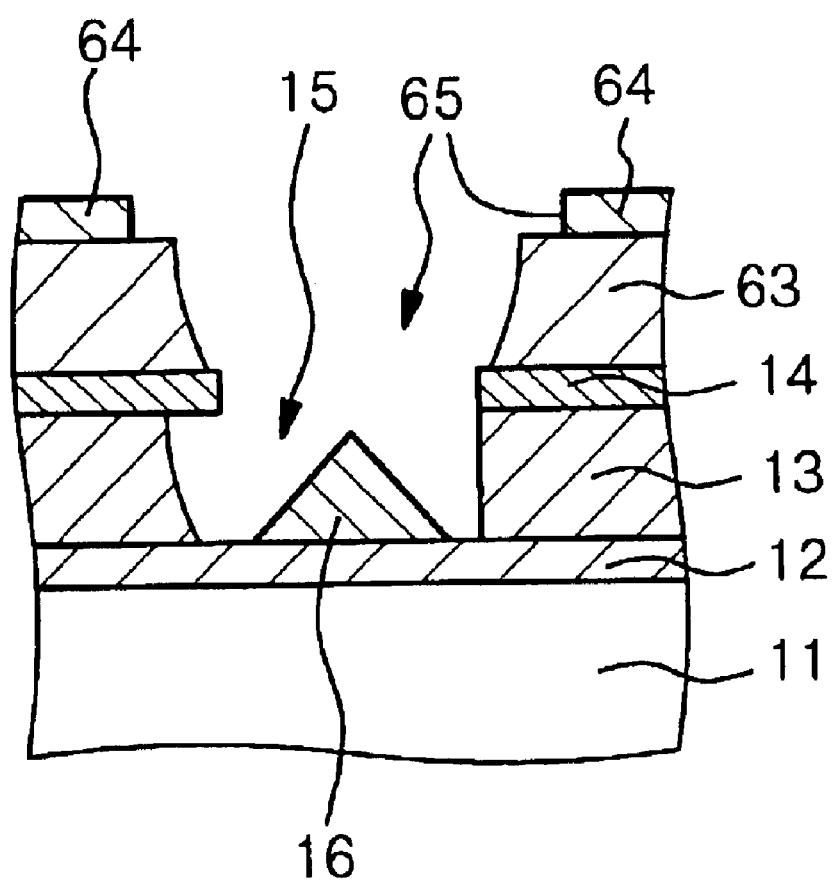
FIG. 18 is a schematic partial end view of a Spindt-type cold cathode field emission device having a focus electrode.

In the field emission device, further, a second insulating layer 63 may be formed on the gate electrode 14 and the insulating layer 13, and the focus electrode 64 may be formed on the second insulating layer 63. FIG. 18 shows a schematic partial end view of a field emission device having the above structure. A third opening portion 65 communicating with the opening portion 15 is formed through the focus electrode 64 and the second insulating layer 63. In the formation of the focus electrode 64, for example, the stripe-shaped gate electrode 14 is formed on the insulating layer 13 in [Step-100]; then, the second insulating layer 63 is formed; then, the patterned focus electrode 64 is formed on the second insulating layer 63; the third opening portion 65 is formed through the focus electrode 64 and the second insulating layer 63; and further, the opening portion 15 is formed through the gate electrode 14 and the insulating layer 13. The focus electrode can have a form in which focus electrode units each of which corresponds to one or a plurality of electron-emitting portions or one or plurality of pixels are gathered depending upon patterning of the focus electrode. Otherwise, the focus electrode can have a form in which one sheet-shaped electrically conductive material covers the effective field. FIG. 18 shows a Spindt-type field emission device, while other field emission devices may naturally be employed.

Not only the focus electrode is formed by the above method, but also the focus electrode can be formed by forming an insulating film made, for example, of $SiO_2$ on each surface of a metal sheet made, for example, of 42% Ni—Fe alloy having a thickness of several tens micrometers, and then forming the opening portions in regions corresponding to pixels by punching or etching. And, the cathode panel, the metal sheet and the anode panel are stacked, a frame is arranged in circumferential portions of the two panels, and a heat treatment is carried out to bond the insulating film formed on one surface of the metal sheet and the insulating layer 13 and to bond the insulating film formed on the other surface of the metal sheet and the anode panel, whereby these members are integrated, followed by evacuating and sealing. In this manner, the cold cathode field emission display can be also completed. Alternatively, the cathode panel and the metal sheet are stacked, a heat treatment is carried out to bond these members, and then the cathode panel and the anode panel are assembled, whereby the cold cathode field emission display can be also completed.

Figure 19:
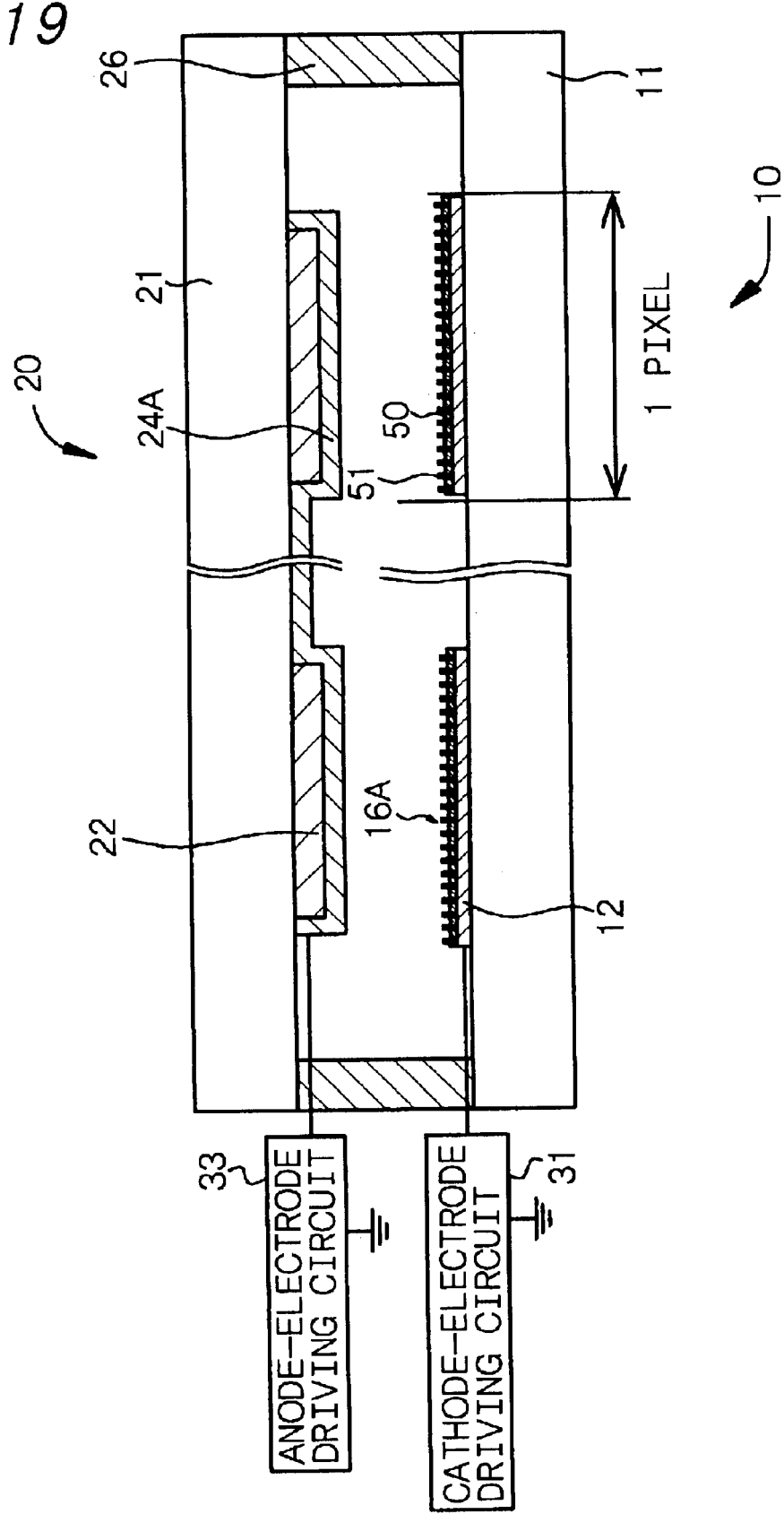
FIG. 19 is a schematic partial cross-sectional view of a so-called two-electrodes-type cold cathode field emission display.
Figure 20:
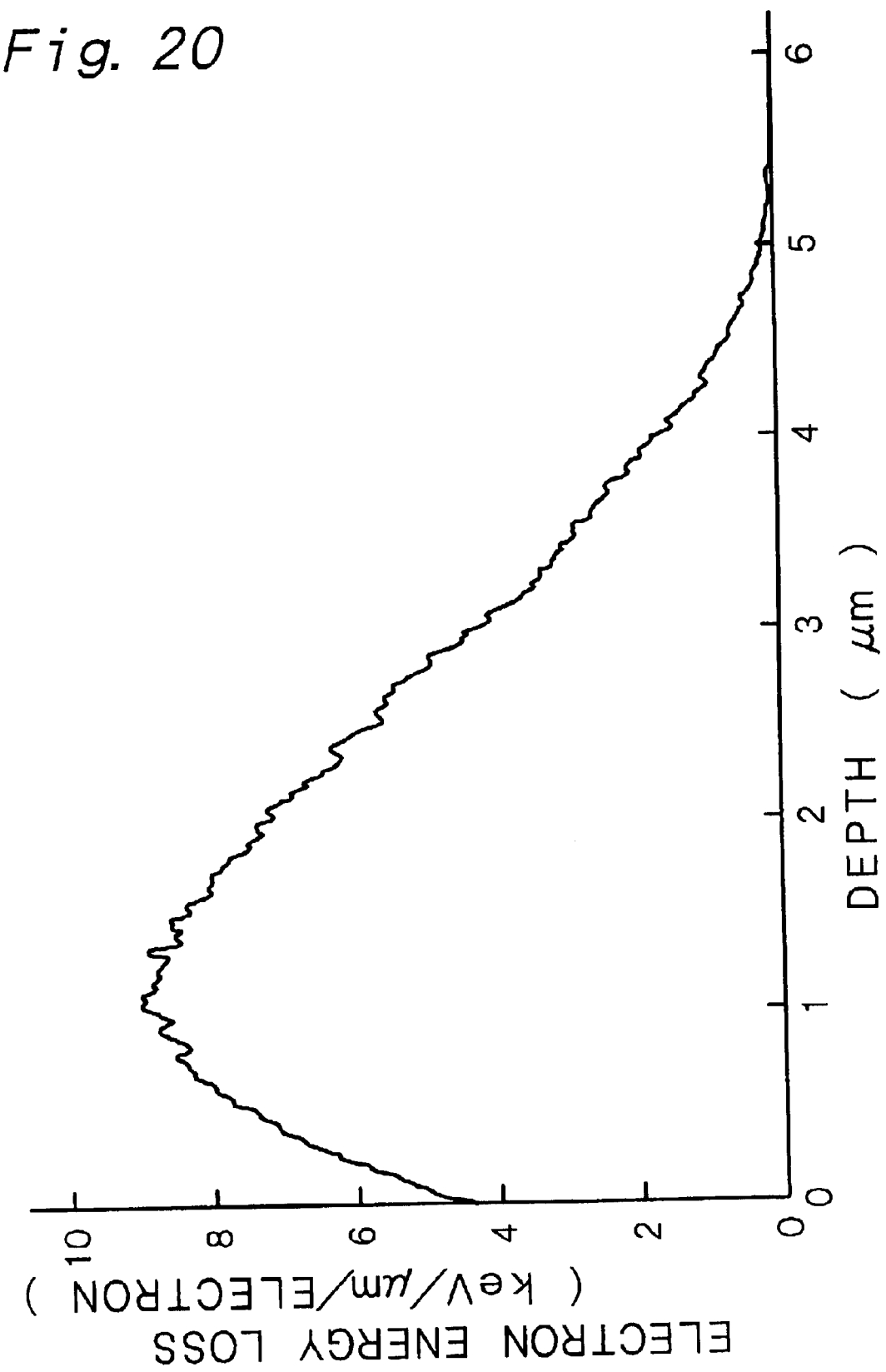
FIG. 20 is a graph showing a result of Monte Carlo simulation carried out with regard to a relationship between an energy loss of electrons which have entered a luminescent layer and the electron entering depth into the luminescent layer on the basis of the Bethe expression, in which the accelerating voltage is set at 31.5 kilovolts and the luminescent layer is made of ZnS.
Figure 21:
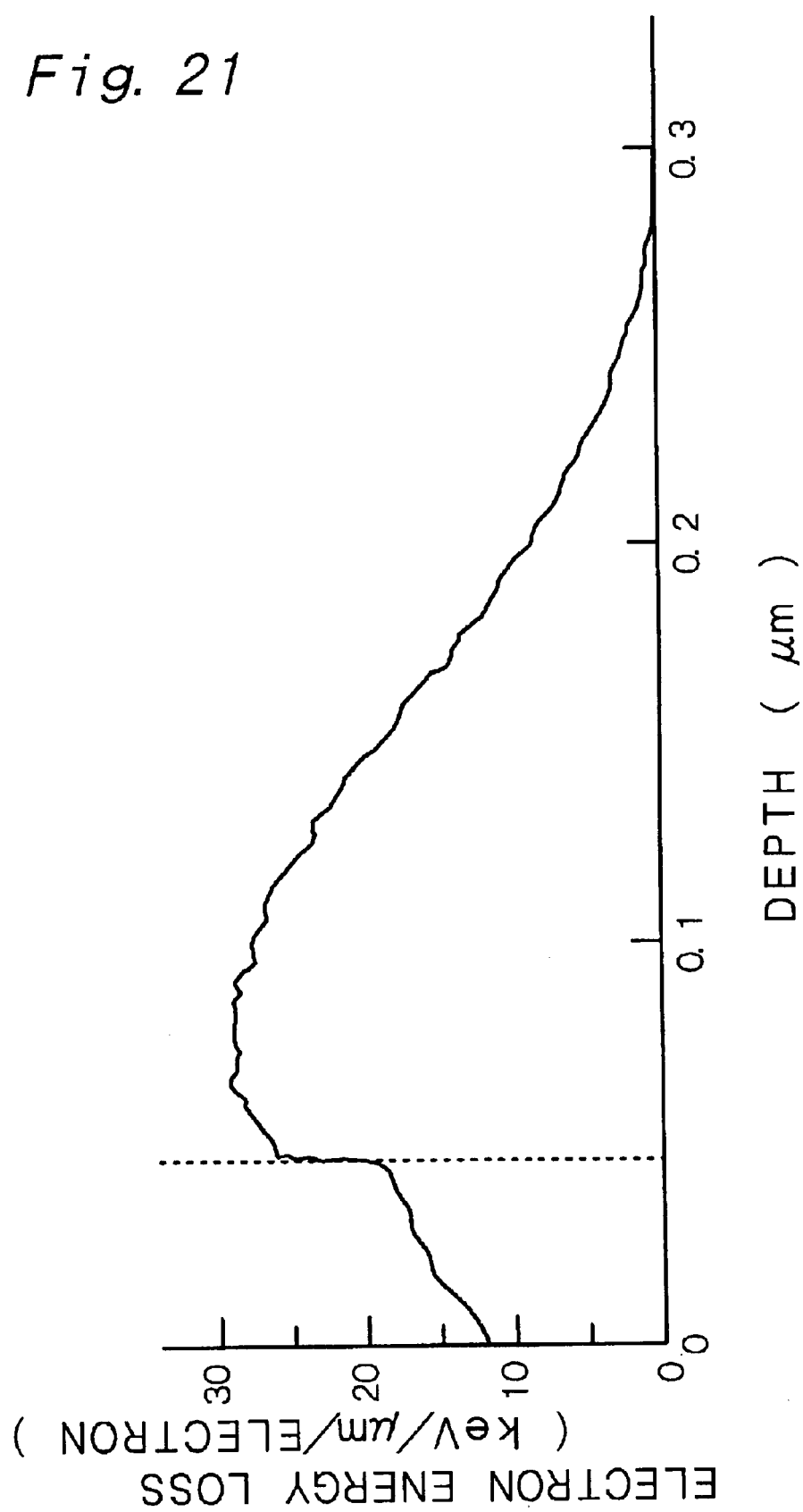
FIG. 21 is a graph showing a result of Monte Carlo simulation carried out with regard to a relationship between an energy loss of electrons which have entered a luminescent layer and the electron entering depth into the luminescent layer on the basis of the Bethe expression, in which the accelerating voltage is set at 6 kilovolts and the luminescent layer is made of ZnS.
Figure 22:
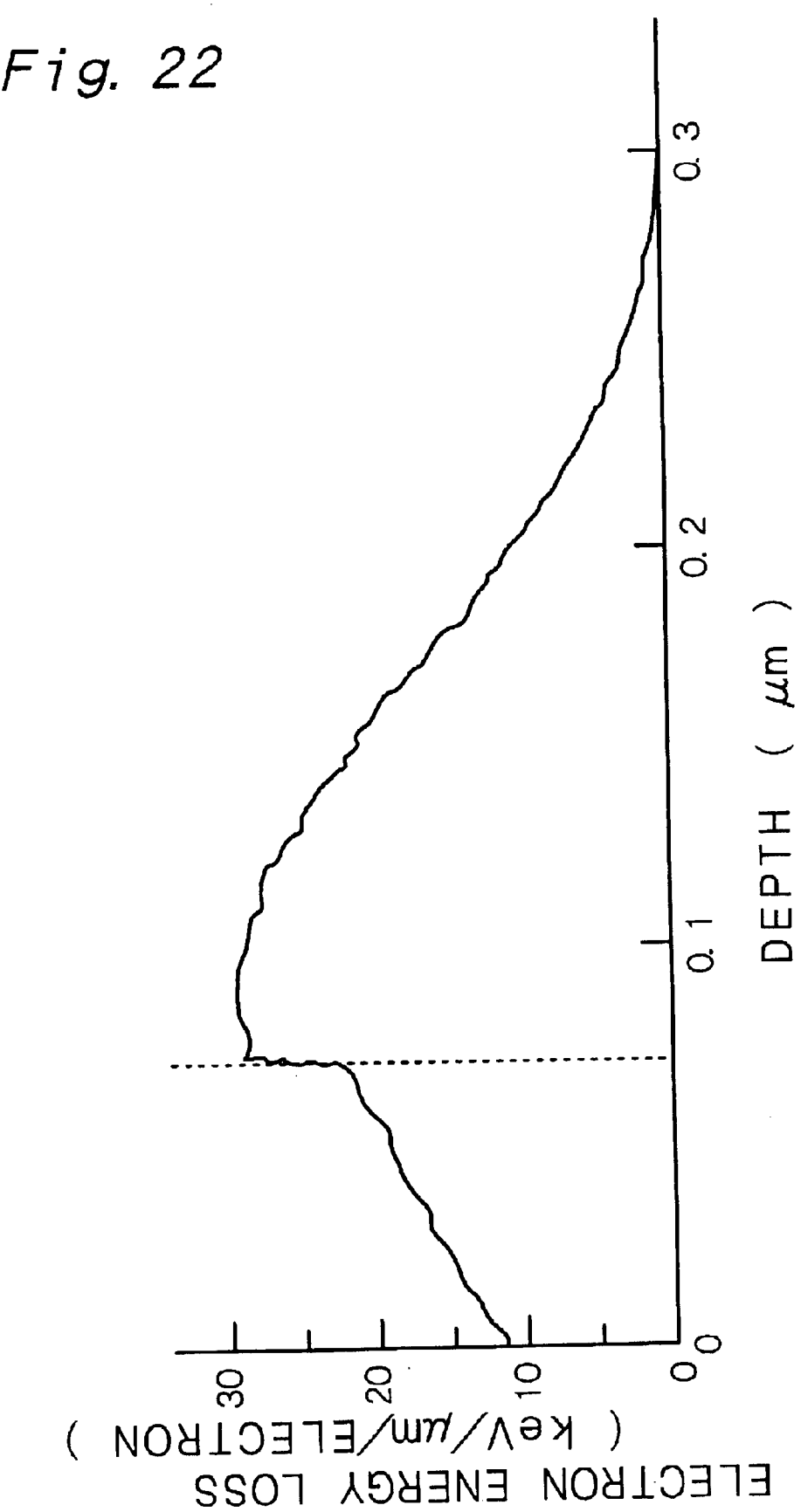
FIG. 22 is a graph showing a result of Monte Carlo simulation carried out with regard to a relationship between an energy loss of electrons which have entered a luminescent layer and the electron entering depth into the luminescent layer on the basis of the Bethe expression, in which the accelerating voltage is set at 6 kilovolts and the luminescent layer is made of ZnS.
Figure 23:
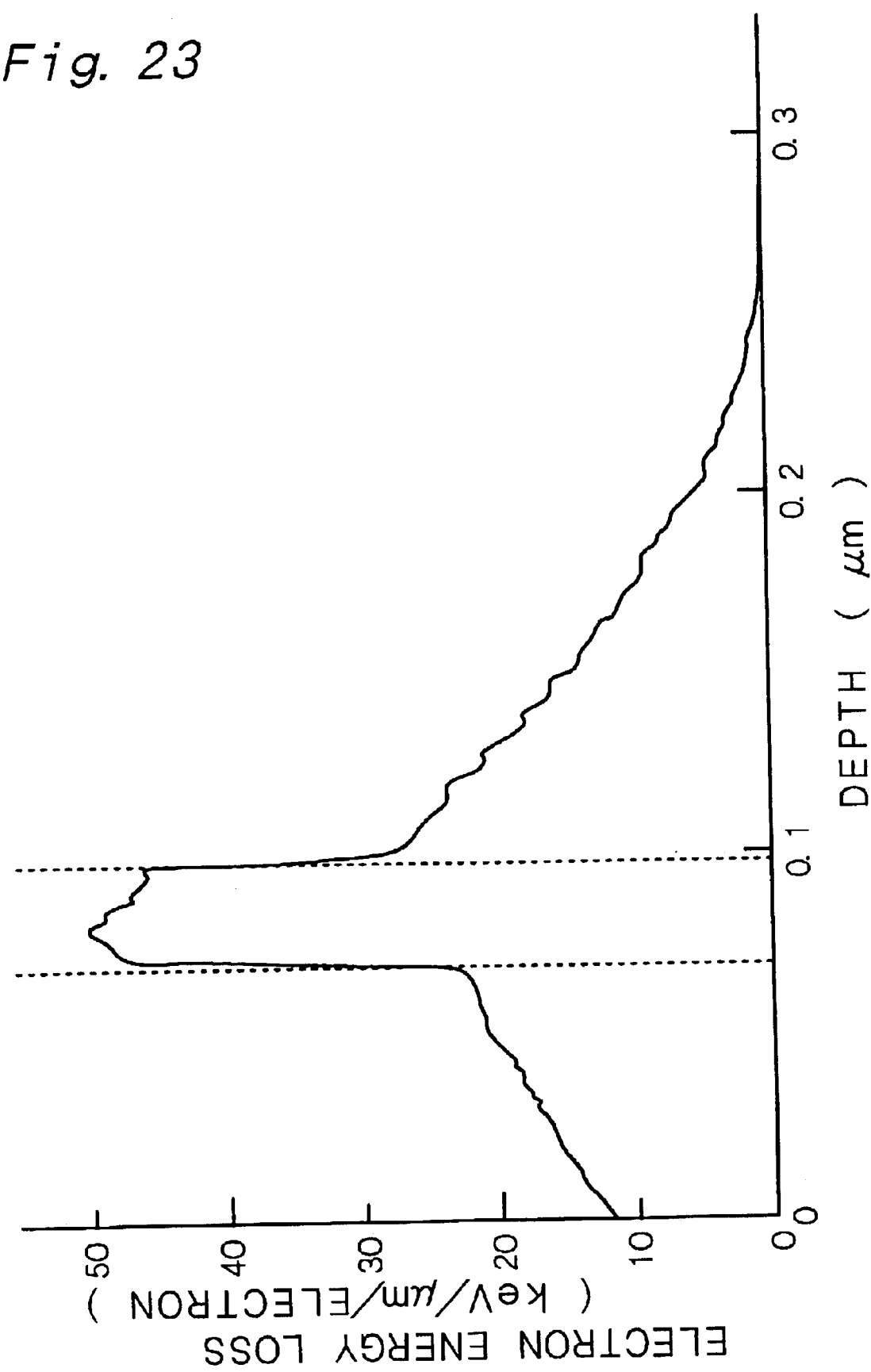
FIG. 23 is a graph showing a result of Monte Carlo simulation carried out with regard to a relationship between an energy loss of electrons which have entered a luminescent layer and the electron entering depth into the luminescent layer on the basis of the Bethe expression, in which the accelerating voltage is set at 6 kilovolts and the luminescent layer is made of Zn and ZnS.

The cold cathode field emission display shall not be limited to a so-called three-electrodes-type constituted of a cathode electrode, a gate electrode and an anode electrode, and it may be of a so-called two-electrodes-type constituted of a cathode electrode and an anode electrode. FIG. 19 shows a schematic partial cross-sectional view of a cold cathode field emission display having such a structure. Showing of a black matrix is omitted in FIG. 19. The field emission device in the above cold cathode field emission display comprises a cathode electrode 12 formed on a substrate 11 and an electron-emitting portion 16A constituted of carbon nano-tubes 51 formed on the cathode electrode 12. An anode electrode 24A constituting the display panel (anode panel) 20 has the form of a stripe. The structure of the electron-emitting portion shall not be limited to the carbon nano-tube structure. The projection image of the stripe-shaped cathode electrode 12 and the projection image of the stripe-shaped anode electrode 24A cross each other at right angles. Specifically, the cathode electrode 12 extends in the direction perpendicular to the paper surface of the drawing, and the anode electrode 24A extends leftward and rightward on the paper surface of the drawing. In a back panel (cathode panel) 10 in the above cold cathode field emission display, a number of electron-emitting portions each of which is constituted of a plurality of the above field emission devices are formed on the effective field in the form of a two-dimensional matrix. The display panel (anode panel) 20 and the back panel (cathode panel) 10 are bonded to each other through a frame 26 in their circumferential portions.

In the above cold cathode field emission display, electrons are emitted from the electron-emitting portion 16A on the basis of a quantum tunnel effect under an electric field formed with the anode electrode 24A, and the electrons are attracted toward the anode electrode 24A to collide with the luminescent layer 22. That is, the cold cathode field emission display is driven by a so-called simple matrix method in which electrons are emitted from the electron-emitting portion 16A positioned in a region where the projection image of the anode electrode 24A and the projection image of the cathode electrode 12 overlap each other (anode electrode/cathode electrode overlap region). Specifically, a relatively negative voltage is applied to the cathode electrode 12 from the cathode-electrode driving circuit 31 and a relatively positive voltage is applied to the anode electrode 24A from the accelerating power source (anode-electrode driving circuit) 33. As a result, electrons are selectively released into a vacuum space from the carbon nano-tubes 51 constituting the electron-emitting portion 16A positioned in the anode electrode/cathode electrode overlap region of a cathode electrode 12 selected as a column and an anode electrode 24A selected as a row (or a row-selected cathode electrode 12 selected as a row and an anode electrode 24A selected as a column), and the electrons are attracted toward the anode electrode 24A to collide with the luminescent layer 22 constituting the display panel (anode panel) 20. The electrons excite the luminescent layer 22 to emit light.

Further, the electron-emitting region can be also constituted of devices generally called surface-conduction-type field emission devices. The surface-conduction-type field emission device comprises a substrate made of, for example, glass and pairs of electrodes formed on the substrate in the form of matrix, the electrodes being made of an electrically conductive material such as tin oxide ($SnO_2$), gold (Au), indium oxide ($In_2O_3$)/tin oxide ($SnO_2$), carbon or palladium oxide (PdO) and having a fine area and a pair of the electrodes being arranged at constant intervals (gaps). A carbon thin film is formed on each electrode. A row-direction wiring is connected to one electrode of a pair of the electrodes, and a column-direction wiring is connected to the other electrode of a pair of the electrodes. When a voltage is applied to a pair of the electrodes, an electric field is applied to the carbon thin films opposed to each other through the gap, and electrons are emitted from the carbon thin film. Such electrons are allowed to collide with a luminescent layer (phosphor layer) on a display panel (anode panel) to excite the luminescent layer (phosphor layer), whereby a desired image can be obtained.

In the present invention, since the crystallinity of the phosphor powder is improved, not only the luminescence efficiency of the phosphor powders can be improved but also the deterioration of the phosphor powders can be prevented. As a result, the deterioration of the brightness, for example, of the flat-panel display with elapse of time can be decreased to such an extent that the deterioration causes almost no problems in practical use.

What is claimed is:

1. A phosphor powder comprising (A) a host material, (B) an activator and (C) a co-activator,
   wherein the host material is constituted of zinc and sulfur, the activator is constituted of silver or copper, and the co-activator is constituted of aluminum,
   wherein the amount ratio of the activator to the host material is $1 \times 10^{-4}$ to $1 \times 10^{-3}$ parts by weight when the amount ratio of the host material is 1 part by weight, and the co-activator has a molar concentration equal to a molar concentration of the activator, and wherein a contaminative chlorine concentration of a chlorine-containing compound contained in the phosphor powder is 20 ppm or less.

2. A phosphor powder comprising (A) a host material, (B) an activator and (C) a co-activator, said phosphor powder having a surface free of a topmost-surface crystal-lattice-defect layer or a surface-damaged layer wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, and wherein a contaminative chlorine concentration of a chlorine-containing compound contained in the phosphor powder is 20 ppm or less.

3. A phosphor powder comprising (A) a host material, (B) an activator and (C) a co-activator, said phosphor powder having a surface coated with a chemical-reaction layer containing phosphoric acid wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, wherein the chemical-reaction layer is made of zinc phosphate or calcium phosphate and has an average thickness of 1 nm to 5 nm, wherein a topmost-surface crystal-lattice-defect layer or a surface-damaged layer is removed from the surface of the phosphor powder immediately below the chemical-reaction layer, and wherein a contaminative chlorine concentration of a chlorine-containing compound contained in the phosphor powder is 20 ppm or less.

4. A phosphor powder comprising (A) a host material, (B) an activator and (C) a co-activator, said phosphor powder having a surface coated with a chemical-reaction layer containing phosphoric acid and a temperature $T_{50}$ of at least 200° C., the temperature $T_{50}$ being a temperature at which a luminescence efficiency reaches ½ of a luminescence efficiency at 25° C. in a thermal quenching performances, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, wherein a topmost-surface crystal-lattice-defect layer or a surface-damaged layer is removed from the surface of the phosphor powder immediately below the chemical-reaction layer, and wherein a contaminative chlorine concentration of a chlorine-containing compound contained in the phosphor powder is 20 ppm or less.

5. A display panel comprising a support member, a luminescent layer made of phosphor powders which emit light upon irradiation with electrons that come flying through a vacuum space, and an electrode, wherein said phosphor powder comprises (A) a host material, (B) an activator and (C) a co-activator, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, and wherein a contaminative chlorine concentration of a chlorine-containing compound contained in the phosphor powder is 20 ppm or less.

6. A display panel comprising a support member, a luminescent layer made of phosphor powders which emit light upon irradiation with electrons that come flying through a vacuum space, and an electrode, wherein said phosphor powder comprises (A) a host material, (B) an activator and (C) a co-activator, and has a surface free of a topmost-surface crystal-lattice-defect layer or a surface-damaged layer, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, and wherein a contaminative chlorine concentration of a chlorine-containing compound contained in the phosphor powder is 20 ppm or less.

7. A display panel comprising a support member, a luminescent layer made of phosphor powders which emit light upon irradiation with electrons that come flying through a vacuum space, and an electrode, wherein said phosphor powder comprises (A) a host material, (B) an activator and (C) a co-activator, and has a surface coated with a chemical-reaction layer containing phosphoric acid, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, wherein the chemical-reaction layer is made of zinc phosphate or calcium phosphate and has an average thickness of 1 nm to 5 nm, wherein a topmost-surface crystal-lattice-defect layer or a surface-damaged layer is removed from the surface of the phosphor powder immediately below the chemical-reaction layer, and wherein a contaminative chlorine concentration of a chlorine-containing compound contained in the phosphor powder is 20 ppm or less.

8. A display panel comprising a support member, a luminescent layer made of phosphor powders which emit light upon irradiation with electrons that come flying through a vacuum space, and an electrode, wherein said phosphor powder comprises (A) a host material, (B) an activator and (C) a co-activator, and said phosphor powder has a surface coated with a chemical-reaction layer containing phosphoric acid and has a temperature $T_{50}$ of at least 200° C., the temperature $T_{50}$ being a temperature at which a luminescence efficiency reaches ½ of a luminescence efficiency at 25° C. in a thermal quenching performances, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, wherein a topmost-surface crystal-lattice-defect layer or a surface-damaged layer is removed from the surface of the phosphor powder immediately below the chemical-reaction layer, and wherein a contaminative chlorine concentration of a chlorine-containing compound contained in the phosphor powder is 20 ppm or less.

9. A flat-type display device comprising a display panel and a back panel having a plurality of electron emitting regions, the display panel and the back panel being disposed to face each other through a vacuum space interposed therebetween, wherein the display panel comprises a support member, a luminescent layer made of phosphor powders which emit light upon irradiation with electrons that come flying from the electron emitting region, and an electrode, wherein said phosphor powder comprises (A) a host material, (B) an activator and (C) a co-activator, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, and wherein a contaminative chlorine concentration of a chlorine-containing compound contained in the phosphor powder is 20 ppm or less.

10. A flat-type display device comprising a display panel and a back panel having a plurality of electron emitting regions, the display panel and the back panel being disposed to face each other through a vacuum space interposed therebetween, wherein the display panel comprises a support member, a luminescent layer made of phosphor powders which emit light upon irradiation with electrons that some flying from the electron emitting region, and an electrode, wherein said phosphor powder comprises (A) a host material, (B) an activator and (C) a co-activator, and has a surface free of a topmost-surface crystal-lattice-defect layer or a surface-damaged layer, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, and wherein a contaminative chlorine concentration of a chlorine-containing compound contained in the phosphor powder is 20 ppm or less.

11. A flat-type display device comprising a display panel and a back panel having a plurality of electron emitting regions, the display panel and the back panel being disposed to face each other through a vacuum space interposed therebetween, wherein the display panel comprises a support member, a luminescent layer made of phosphor powders which emit light upon irradiation with electrons that come flying from the electron emitting region, and an electrode, wherein said phosphor powder comprises (A) a host material, (B) an activator and (C) a co-activator, and has a surface coated with a chemical-reaction layer containing phosphoric acid, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, wherein the chemical-reaction layer is made of zinc phosphate or calcium phosphate and has an average thickness of 1 nm to 5 nm, wherein a topmost-surface crystal-lattice-defect layer or a surface-damaged layer is removed from the surface of the phosphor powder immediately below the chemical-reaction layer, and wherein a contaminative chlorine concentration of a chlorine-containing compound contained in the phosphor powder is 20 ppm or less.

12. A flat-type display device comprising a display panel and a back panel having a plurality of electron emitting regions, the display panel and the back panel being disposed to face each other through a vacuum space interposed therebetween, wherein the display panel comprises a support member, a luminescent layer made of phosphor powders which emit light upon irradiation with electrons that come flying from the electron emitting region, and an electrode, and wherein said phosphor powder comprises (A) a host material, (B) an activator and (C) a co-activator, and said phosphor powder has a surface coated with a chemical-reaction layer containing phosphoric acid and has a temperature $T_{50}$ of at least 200° C., the temperature $T_{50}$ being a temperature at which a luminescence efficiency reaches ½ of a luminescence efficiency at 25° C. in a thermal quenching performances, wherein the host material is constituted of zinc and sulfur, the activator is constituted of silver or copper, and the co-activator is constituted of aluminum, wherein the amount ratio of the activator to the host material is $1\times10^{-4}$ to $1\times10^{-3}$ parts by weight when the amount ratio of the host material is 1 part by weight, and the co-activator has a molar concentration equal to a molar concentration of the activator, wherein a topmost-surface crystal-lattice-defect layer or a surface-damaged layer is removed from the surface of the phosphor powder immediately below the chemical-reaction layer, and wherein a contaminative chlorine concentration of a chlorine-containing compound contained in the phosphor powder is 20 ppm or less.

13. A production method of a phosphor powder, comprising preparing a host material by a solution-preparation step and a reaction step, then, mixing the host material with an activator and a co-activator, and then carrying out a firing step and a surface-treatment step, and the production method further comprising a removal step of removing a topmost-surface crystal-lattice-defect layer or a surface-damaged layer formed in the surface of the firing product between the firing step and the surface-treatment step.

14. The production method of a phosphor powder according to claim 13, wherein the removal step comprises an annealing treatment or an etching treatment.

15. The production method of a phosphor powder according to claim 14, wherein the annealing is carried out at a temperature lower than a firing temperature employed in the firing step.

16. The production method of a phosphor powder according to claim 14, wherein the etching treatment is carried out using, as an etching solution, a solution prepared by mixing a persaturated solution consisting of phosphoric acid into which $CrO_3$ is added, with concentrated hydrochloric acid in the persaturated solution: the concentrated hydrochloric acid mixing ratio of 1:2.

17. The production method of a phosphor powder according to claim 13, wherein the phosphor powder is composed of a host material made of an element coming under the group II of the periodic table and an element coming under the group VI of the periodic table, an activator and a co-activator, and the amount ratio of the activator to the host material is $1 \times 10^{-4}$ to $1 \times 10^{-3}$ parts by weight when the amount ratio of the host material is 1 part by weight, and the co-activator has a molar concentration equal to a molar concentration of the activator.

18. The production method of a phosphor powder according to claim 17, wherein the elements for constituting the host material are zinc and sulfur, the element for constituting the activator is silver, and the element for constituting the co-activator is aluminum.

19. The production method of a phosphor powder according to claim 17, wherein the elements for constituting the host material are zinc and sulfur, the element for constituting the activator is copper, and the element for constituting the co-activator is aluminum.

20. The production method of a phosphor powder according to claim 13, wherein a washing step is provided between the firing step and the removal step, and the firing product is washed so that a chlorine concentration of a chlorine-containing compound contained in the phosphor powder is 20 ppm or less.

21. The production method of a phosphor powder according to claim 13 or 20, wherein the surface of the phosphor powder is coated with a chemical-reaction layer containing phosphoric acid in the surface-treatment step.

22. A production method of a phosphor powder, comprising preparing a host material by a solution-preparation step and a reaction step, then, mixing the host material with an activator and a co-activator, and then carrying out a firing step and a surface-treatment step, wherein the firing step is followed by a washing step, and the firing product is washed so that a chlorine concentration of a chlorine-containing compound contained in the phosphor powder is 20 ppm or less.

23. The production method of a phosphor powder according to claim 22, wherein the phosphor powder is composed of a host material made of an element coming under the group II of the periodic table and an element coming under the group VI of the periodic table, an activator and a co-activator, and the amount ratio of the activator to the host material is $1 \times 10^{-4}$ to $1 \times 10^{-3}$ parts by weight when the amount ratio of the host material is 1 part by weight, and the co-activator has a molar concentration equal to a molar concentration of the activator.

24. The production method of a phosphor powder according to claim 23, wherein the elements for constituting the host material are zinc and sulfur, the element for constituting the activator is silver, and the element for constituting the co-activator is aluminum.

25. The production method of a phosphor powder according to claim 23, wherein the elements for constituting the host material are zinc and sulfur, the element for constituting the activator is copper, and the element for constituting the co-activator is aluminum.

26. The production method of a phosphor powder according to claim 22, wherein the surface of the phosphor powder is coated with a chemical-reaction layer containing phosphoric acid in the surface-treatment step.

27. A production method of a phosphor powder, comprising preparing a host material by a solution-preparation step and a reaction step, then, mixing the host material with an activator and a co-activator, and then carrying out a firing step and a surface-treatment step, wherein the surface of the phosphor powder is coated with a chemical-reaction layer containing phosphoric acid in the surface-treatment step wherein the host material is constituted of zinc and sulfur, the activator is constituted of silver or copper, and the co-activator is constituted of aluminum, and wherein the amount ratio of the activator to the host material is $1 \times 10^{-4}$ to $1 \times 10^{-3}$ parts by weight when the amount ratio of the host material is 1 part by weight, and the co-activator has a molar concentration equal to a molar concentration of the activator.

* * * * *

UNITED STATES PATENT AND TRADEMARK OFFICE
CERTIFICATE OF CORRECTION

PATENT NO. : 6,833,086 B2
DATED : December 21, 2004
INVENTOR(S) : Kajiwara

It is certified that error appears in the above-identified patent and that said Letters Patent is hereby corrected as shown below:

Title page,
Item [54], Title, "METHOD THEROF" should read -- METHOD THEREOF --.
Insert Item -- [30] Foreign Application Priority Data
      March 15, 2001    (JP) ……………………...P2001-074173 --.

Column 41,
Line 30, "with electrons that some" should read -- with electrons that come --.

Signed and Sealed this

Eighth Day of November, 2005

JON W. DUDAS
*Director of the United States Patent and Trademark Office*